United States Patent [19]

Hughes et al.

[11] Patent Number: 5,442,741
[45] Date of Patent: Aug. 15, 1995

[54] METHOD FOR DISPLAYING PIE CHART INFORMATION ON A COMPUTER SCREEN

[75] Inventors: Jeffrey A. Hughes; William R. Marbaker; Jeffrey H. Smith, all of Colorado Springs, Colo.

[73] Assignee: Hewlett-Packard Company, Palo Alto, Calif.

[21] Appl. No.: 226,424

[22] Filed: Apr. 12, 1994

Related U.S. Application Data

[63] Continuation of Ser. No. 790,921, Nov. 13, 1991, abandoned.

[51] Int. Cl.⁶ .................................................. G06T 11/00
[52] U.S. Cl. ................................. 395/142; 395/140; 395/141; 395/133; 395/135
[58] Field of Search .............................. 395/133–136, 395/140, 141, 155–156, 160, 161, 142, 143

[56] References Cited

U.S. PATENT DOCUMENTS

| | | | |
|---|---|---|---|
| 4,320,962 | 3/1982 | Takahashi et al. | 395/135 |
| 4,611,306 | 9/1986 | Crehan et al. | 395/156 |
| 4,641,255 | 2/1987 | Hohmann | 395/135 |
| 4,686,522 | 8/1987 | Hernandez et al. | 340/709 |
| 4,733,248 | 3/1988 | Hibino | 395/140 X |
| 4,757,470 | 7/1988 | Bruce et al. | 395/135 |
| 4,995,015 | 2/1991 | Chiang | 368/11 |

Primary Examiner—Almis R. Jankus

[57] ABSTRACT

A system and method for displaying information on computer screens. The present invention operates in a computer system having a windowing system. The present invention performs its functions without placing a great burden on computer system resources. The present invention contains functions for displaying information in line graphs, bar charts, tables, gauge displays, and pie charts. The present invention may be used to implement statistical dashboard displays for protocol analyzers which monitor token ring and ethernet networks.

21 Claims, 21 Drawing Sheets

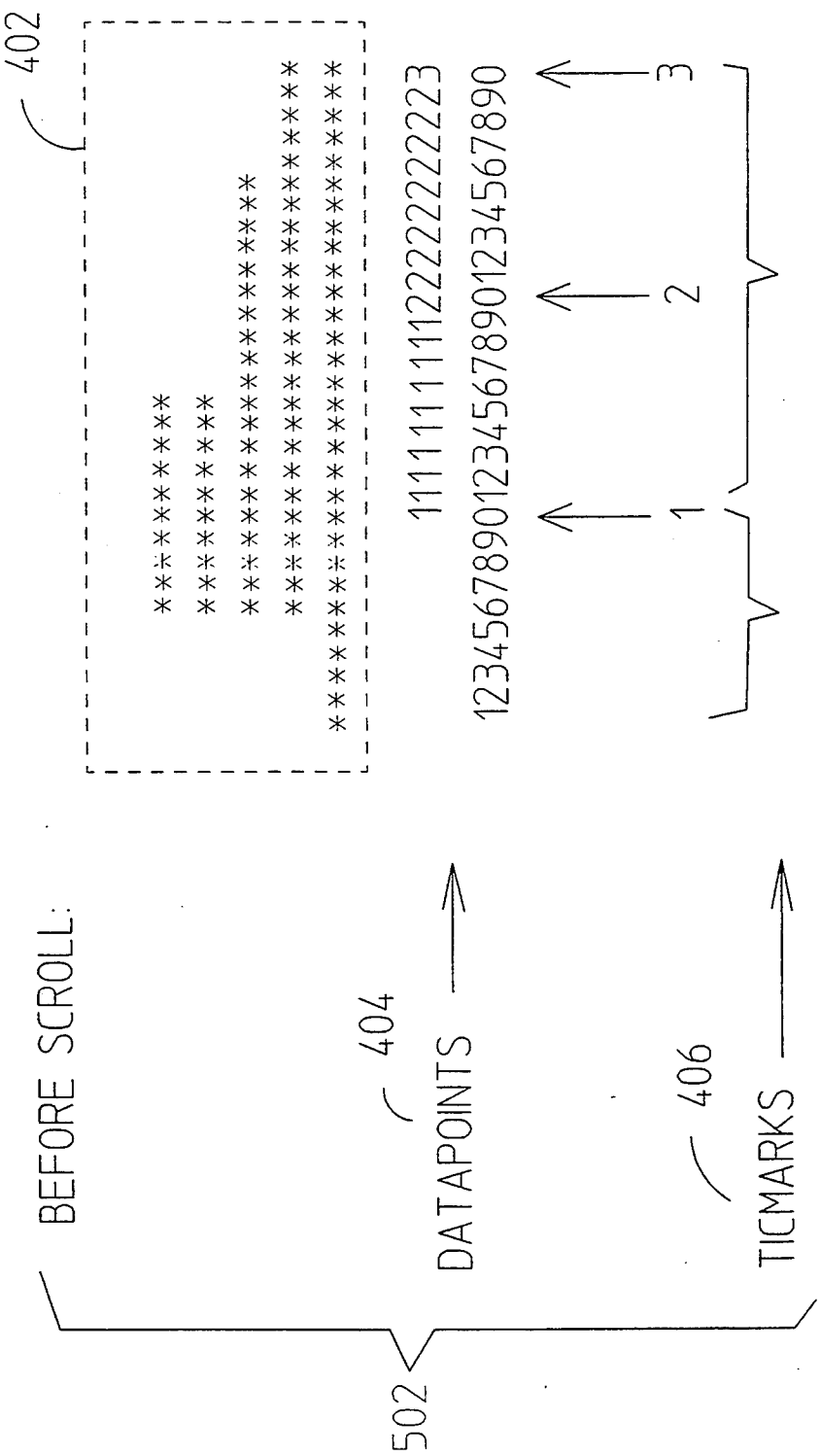

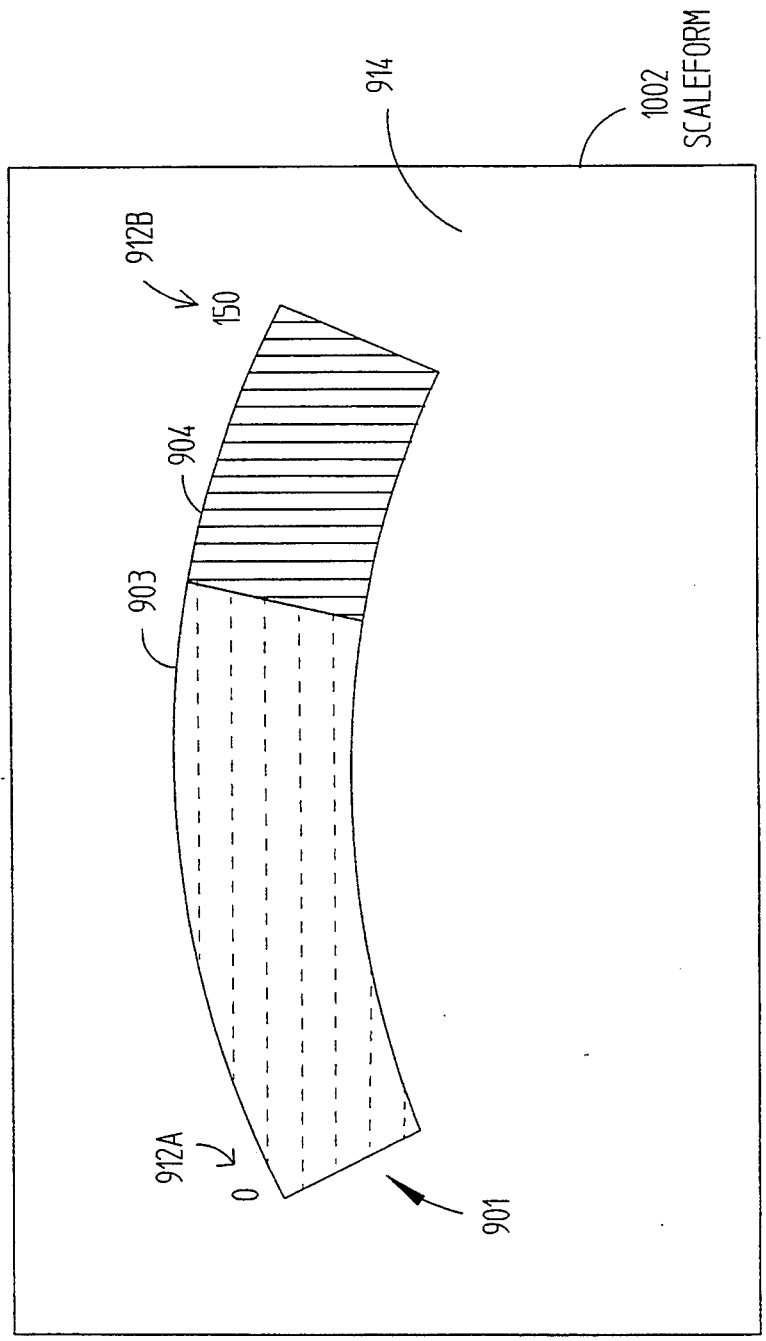

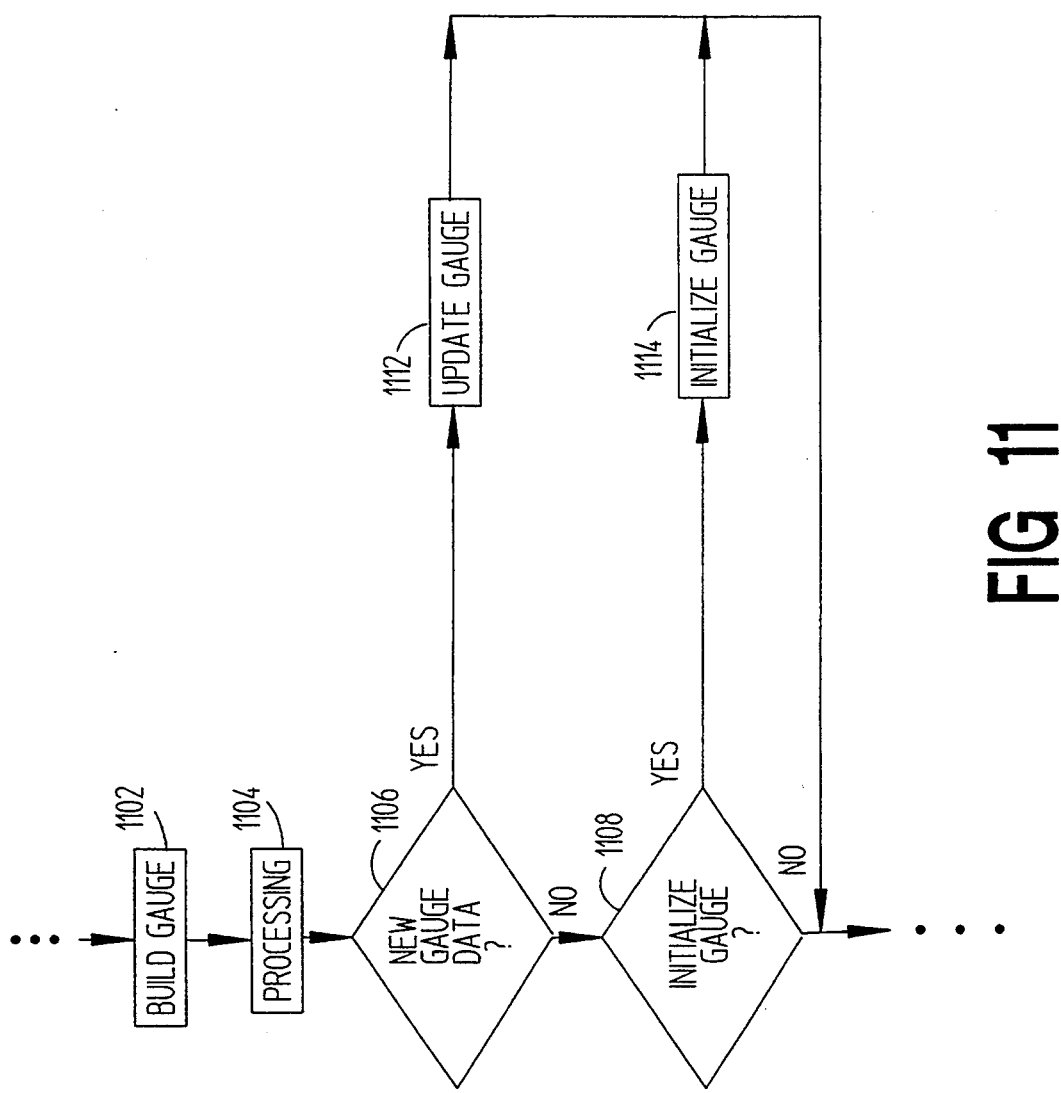

METHOD FOR DISPLAYING PIE CHART INFORMATION ON A COMPUTER SCREEN

CROSS REFERENCE TO RELATED APPLICATIONS

This is a continuation of application Ser. No. 07/790,921 filed on Nov. 13, 1991, now abandoned.

CROSS-REFERENCE TO OTHER APPLICATIONS

The following applications of common assignee contain some common disclosure with that of the present application:

System and Method for Creating and Modifying Graphs in a Computer System Using a Multiple-Segment Graph Format Ser. No. 07/757,890;

System and Method For Rendering A display On A Computer Screen Ser. No. 07/757,890.

BACKGROUND OF THE INVENTION

1. Field of the Invention

The present invention relates generally to computers. More particularly, the present invention relates to systems and methods for displaying information on computer display screens.

2. Related Art

Measurement devices acquire and display information regarding objects under test. For example, protocol analyzers acquire and display information regarding communication networks, such as token ring and ethernet networks.

Conventional measurement devices often display information in tables. Tables are advantageous in that they provide exact information regarding the object under test. In other words, tables provide a quantitative description of the object under test.

However, tables are limited for a number of reasons. First, tables do not provide a qualitative description of the object under test. Rather, operator experience, knowledge, and skill are required to convert the quantitative description of the object under test (provided by the tables) to a qualitative description of the object under test.

Second, operators may easily read the information in tables only when the operators are close to the measurement devices which are displaying the tables. In other words, information in tables are not visible from across a room.

Therefore, systems and methods for effectively and efficiently displaying information on computer display screens are required.

SUMMARY OF THE INVENTION

The present invention is directed to a system and method for displaying information on computer screens. The present invention operates in a computer system having a windowing system. The present invention performs its functions without placing a great burden on computer system resources.

The present invention is useful in many applications. For example, the present invention may be used to implement statistical dashboard displays for protocol analyzers which monitor token ring and ethernet networks.

The present invention includes software functions for creating and maintaining line graphs. According to the present invention, a line graph is drawn on multiple forms. The line graph is initially displayed on a display screen by writing the forms to the display screen. Each form stores a single data point of the line graph. A new data point is added to the line graph by representing the new data point in the appropriate form. To display the new data point on the display screen, only the modified form (that is, the form containing the new data point) is written to the display screen.

The present invention also includes software functions for simulating a gauge on the computer display screen and for displaying information in the gauge. According to the present invention, gauge elements are stored in multiple forms. The gauge is generated by overlaying the forms. The gauge is modified by modifying one or more of the gauge elements in the forms. Thus, the present invention minimizes computation time because the gauge may be modified without modifying all the gauge elements.

The gauge includes a background color, a scale, a shadow, a meter, and a needle. The background color and scale are stored in a scaleForm. The shadow is stored in a shadowForm. The meter is stored in a digitsForm.

The gauge is modified as follows. First, new data is received. Second, it is determined whether the new data falls in an unacceptable zone of the scale. If the new data falls in the unacceptable zone, then the background color in the scaleForm is modified to indicate the unacceptable zone.

Third, it is determined whether the new data falls outside a region of the scale defined by the shadow. If the new data falls outside this region, then the shadow in the shadowForm is modified to include the new data.

Fourth, it is determined whether the new data and an accumulated value in the meter are equal. If the new data and the accumulated value are not equal, then the accumulated value is replaced with the new data in the digitsForm.

The forms are overlayed as follows. First, the scaleForm and shadowForm are logically AND'ed. The result of the logical AND is stored in a gaugeForm. Second, the needle is drawn in the gaugeForm. Third, pixels of the digitsForm are written over corresponding pixels of the gaugeForm.

The present invention also includes software functions for displaying information in pie charts. According to the present invention, a pie chart is built by writing pixel patterns on two forms. A circleForm holds a circle which represents the outline of the pie chart. The contents of the circleForm are copied to a pieChartForm. Straight lines, representing boundaries between segments, are then drawn in the pieChartForm. The resulting segments are colored and segment labels are written in the pieChartForm. In this manner, the pie chart is created.

The outline of the pie chart is saved in the circleForm because (1) the circle of the pie chart does not change after the pie chart is initialized, and (2) drawing the circle is computationally expensive. Thus, the present invention efficiently builds and updates pie charts.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

The present invention will be described with reference to the accompanying drawings, wherein:

FIG. 5A illustrates a line graph 402 before scrolling 502.

FIG. 10A illustrates an example of a scaleForm.

FIG. 11 illustrates a partial flowchart of an application program which uses the present invention to simulate and display data in a gauge.

DETAILED DESCRIPTION OF THE PREFERRED EMBODIMENTS

1. General Operation and Structure

The present invention is directed to systems and methods for efficiently and effectively displaying information on computer display screens. According to the present invention, information may be displayed on computer display screens in a number of formats, such as in line graphs, bar charts, gauge displays, pie charts, and tables.

The present invention is useful in many applications. For example, the present invention may be used to implement statistical dashboard displays for protocol analyzers which monitor token ring and ethernet networks.

Figure 1:
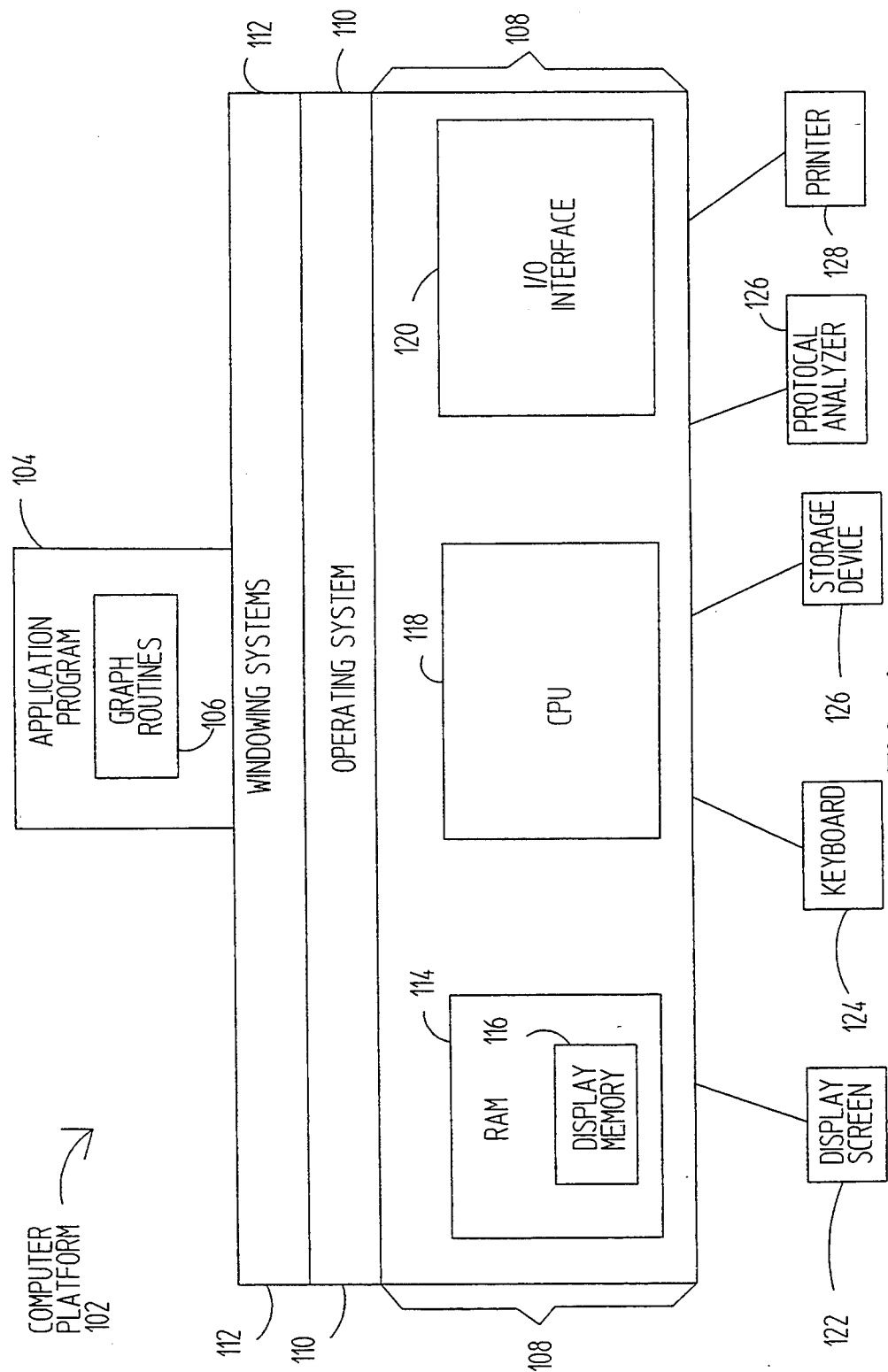
FIG. 1 illustrates a computing environment in which the present invention operates.

FIG. 1 illustrates a computer platform 102 in which the present invention operates.

The computer platform 102 has hardware components 108. The hardware components 108 include a random access memory (RAM) 114, a central processing unit 118, and an input/output (I/O) interface 120. The RAM 114 includes a display memory 116.

The computer platform 102 has an operating system 110 and a windowing system 112. Operating on the computer platform 102 is an application program 104.

The application program 104 includes graph routines 106. According to a preferred embodiment, the graph routines 106 represent the present invention. The graph routines 106 may be part of a software library that has been linked into the application program 104.

The computer platform 102 includes various peripherals, such as a display screen 122, a keyboard 124, a storage device 126, and a printer 128. The peripherals may also include test devices, such as a protocol analyzer 129.

The application program 104 and the protocol analyzer 129 may operate in combination to monitor a communication network, such as a token ring or ethernet network. Specifically, the application program 104 may send measurement commands to the protocol analyzer 129. In response to the measurement commands, the protocol analyzer 129 may acquire information regarding the network. The protocol analyzer 129 may forward this information to the application program 104. The application program 104 may then use the graph routines 106 of the present invention to display the information on the display screen 122.

In the preferred embodiment of the present invention, the computer platform 102 is an International Business Machines (IBM) compatible personal computer. The windowing system 112 is Smalltalk V 286.

The graph routines 106 of the present invention include (1) routines for displaying information in line graphs, (2) routines for displaying information in bar charts, (3) routines for displaying information in gauge displays, and (4) routines for displaying information in pie charts. The graph routines 106 also include well-known routines for displaying information in tables.

The graph routines 106 listed above are described in detail below.

2. Line Graph

This section describes the line graph routines of the present invention. The line graph routines are described herein with regard to Y-vs-time line graphs. However, the line graph routines are directly applicable to other types of graphs, such as scattergrams and bar charts.

Figure 2:
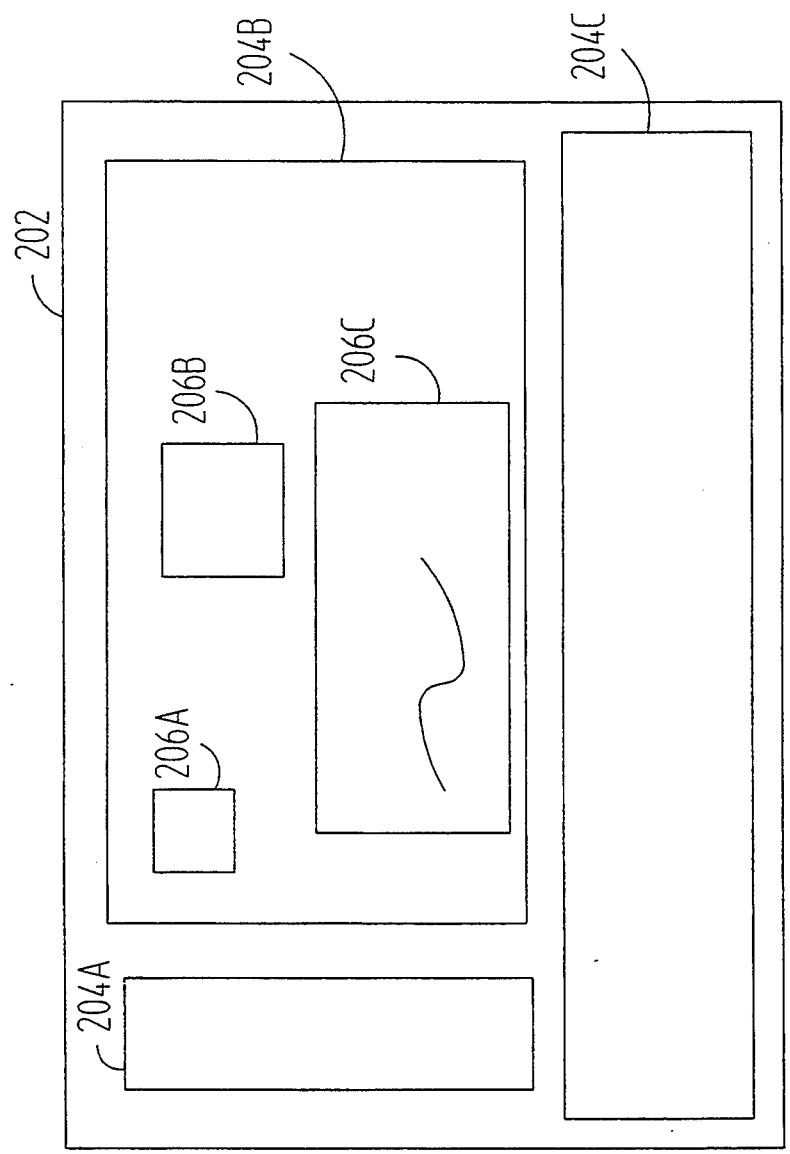
FIG. 2 illustrates a line graph which is produced using conventional line graph routines.

The line graph routines of the present invention may be better understood by considering conventional line graph routines. FIG. 2 illustrates a display image 202 which is produced using conventional line graph routines. The computer image 202 may be either stored in a display memory or displayed on a display screen (or both). Included in the display image 202 are multiple windows 204. Each window contains one or more forms 206.

Each form 206 represents a rectangular area of pixels. A form 206 may be any size. Conventionally, forms 206 are considered to be indivisible elements by the windowing system. Consequently, whenever a screen update of a form is requested, the windowing system writes all of the pixels in the form to the display screen.

According to conventional line graph routines, a graph is drawn on a single form (as illustrated by the form 206C). Adding a new point to the graph involves changing a few pixels in the form 206C. However, to display the new point on the display screen requires that all the pixels in the form 206C be written to the display screen, rather than just the pixels related to the new point.

Writing pixels to the display screen is very resource intensive. Thus, the conventional line graph routines represent a major burden on computer system resources. This is especially true in real-time systems having Y-vs-time linegraphs.

Figure 3:
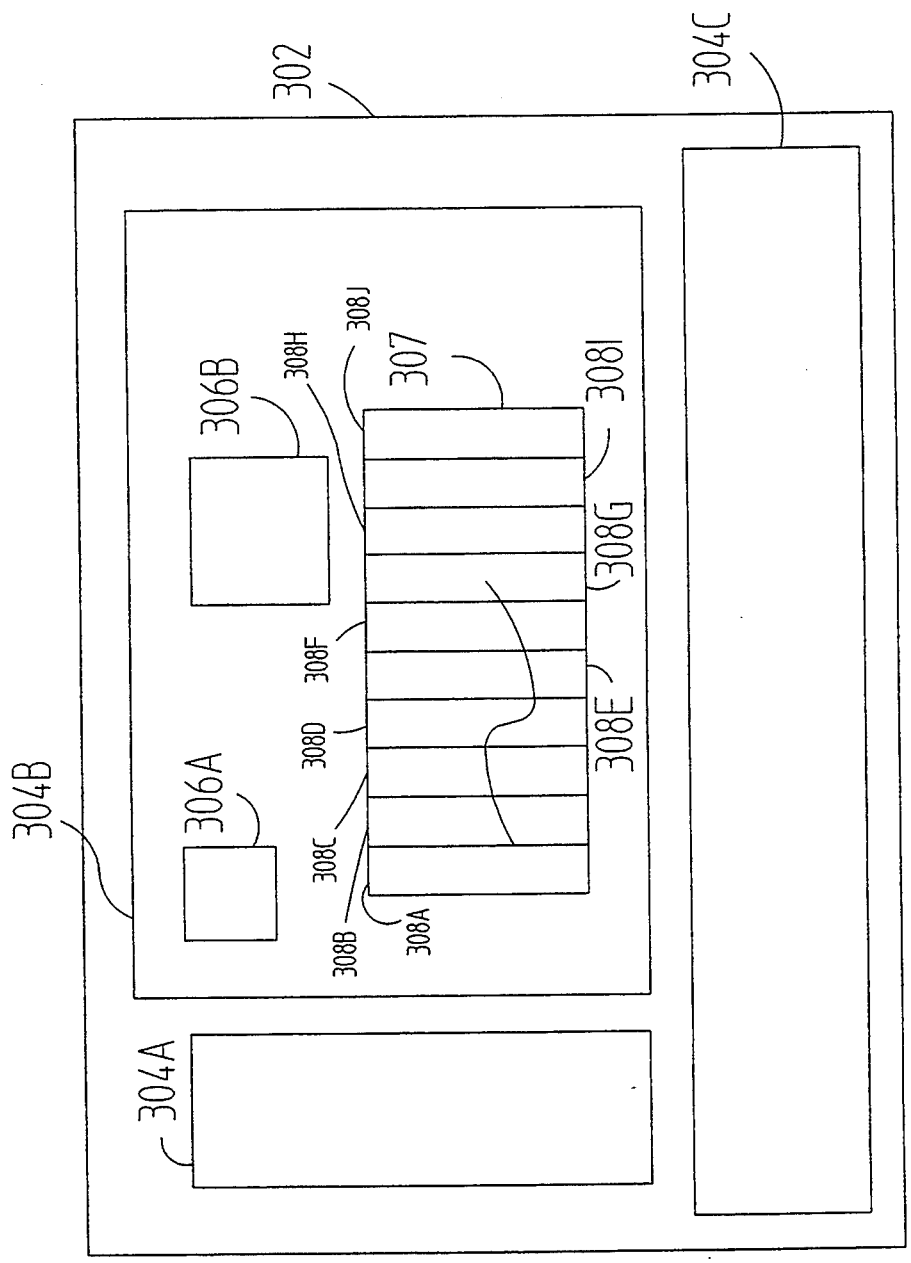
FIG. 3 illustrates a line graph which is produced using line graph routines of the present invention.

The line graph routines of the present invention shall now be described with reference to FIG. 3. FIG. 3 illustrates a display image 302. The display image 302 may be either stored in the display memory 116 or displayed on the display screen 122 (or both). Included in the display image 302 are multiple windows 304. Each window contains one or more forms 306, 308. The window 304B contains a line graph 307.

According to the present invention, the line graph 307 is not drawn on a single form. Rather, the line graph 307 is drawn on multiple forms 308 (note that the breaks between the edges of the individual forms 308 are not visible in the display screen). Adding a new point to the line graph 307 involves changing a few pixels in the appropriate form 308G. Displaying the new point on the display screen 122 requires that only the pixels in the changed form 308G be written to the display screen 122. Thus, the line graph routines conserve computer resources since it is not necessary to re-write all of the pixels associated with the line graph 307.

The line graph routines of the present invention include two components. First, a component to build a line graph. Second, a component to display a data point on the line graph. These two components are described in detail below.

2.1. Build Line graph

Figure 4:
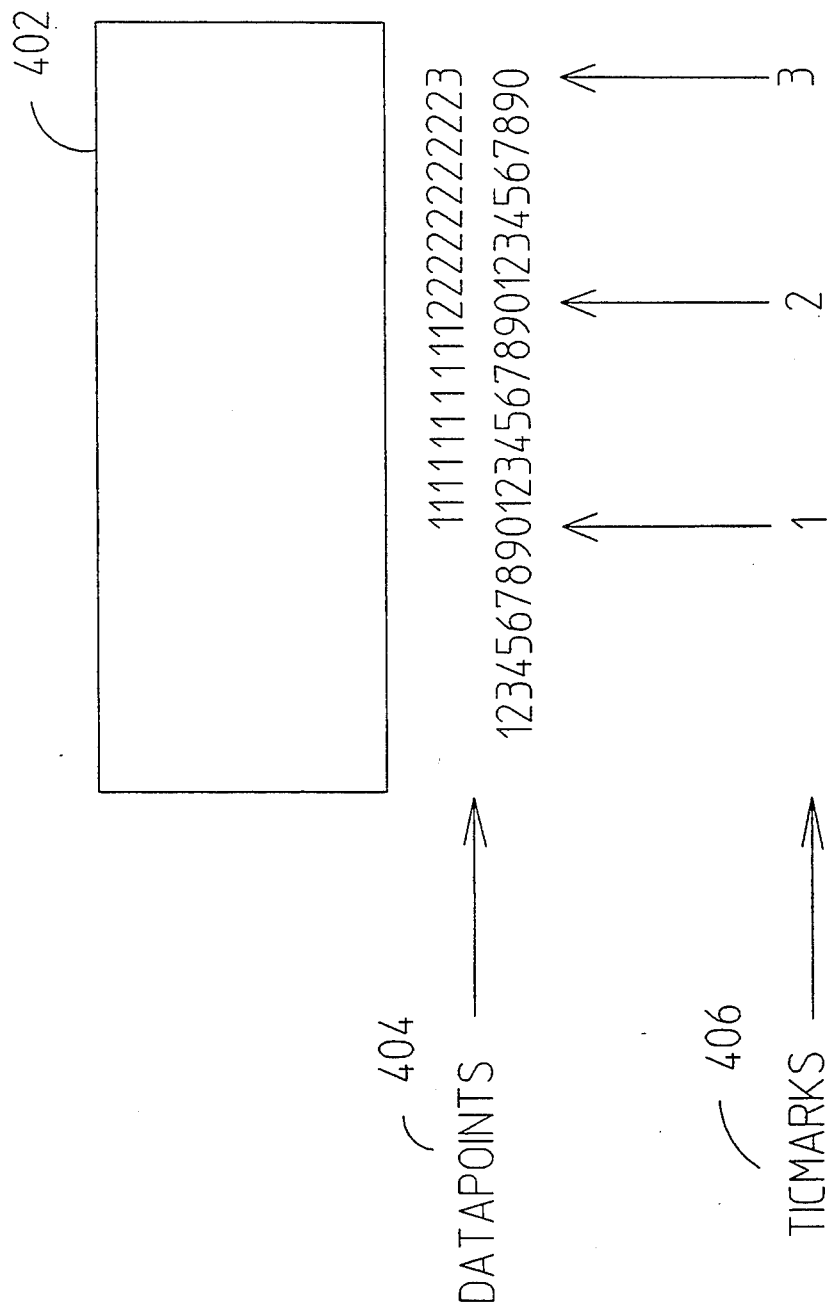
FIG. 4 illustrates a line graph 402 which is created by a Build Linegraph routine 602 of the present invention.
Figure 6:
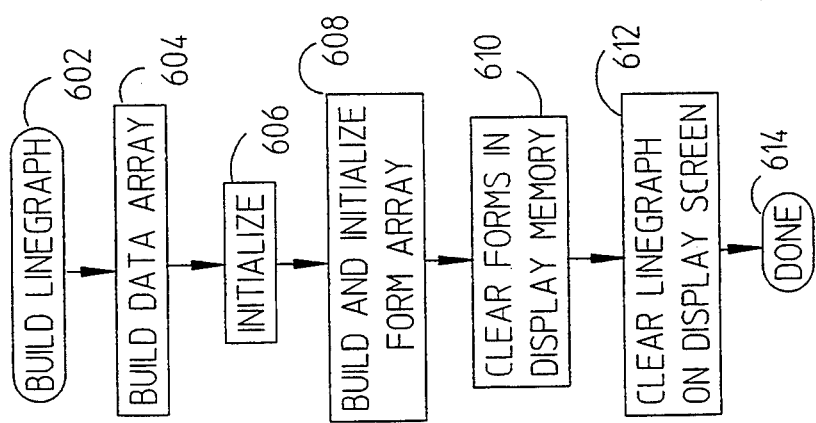
FIG. 6 illustrates a flowchart of a Build Linegraph method 602 of the present invention.

FIG. 6 illustrates a flowchart of a Build Line graph method 602 of the line graph routines. FIG. 4 illustrates a line graph 402 which is created by the Build Line graph method 602.

The following variables must be specified to use the Build Line graph method 602. First, ticmarks (T) 406 must be specified. T 406 equals the number of ticmarks along the horizontal axis of the line graph 402. The ticmarks are not visible on the line graph 402 (although the application program 104 may include separate code to show the ticmarks on a label for the horizontal axis).

Second, datapoints (P) 404 must be specified. P 404 equals the number of datapoints between each pair of ticmarks, including the datapoint at the ticmark.

The total number of datapoints which can be displayed by the line graph 402 is equal to T times P.

The Build Line graph method 602 of the line graph routine shall now be described. For illustrative purposes, assume in the following discussion that we are building a line graph 402 with T=3 and P=10.

In step 604, an array of 1 . . . (T times P) integers is built. This array holds the values of the datapoints to be displayed. The values in the array are initialized to nil. This array is called DataArray.

In step 606, various local variables are initialized. Specifically, a DataIndex variable is initialized to 1. DataIndex indicates the lowest-numbered unused element of a FormArray and the DataArray (that is, where the next datapoint will be plotted). The FormArray is described below.

Also, a Range variable is initialized to 10. Range gives the vertical axis full-scale data value. Since Range is initialized to 10, the line graph 402 can display data values between 0 and 10.

Also during step 606, the size of the line graph 402 (in pixels) is retrieved using well known functions from the windowing system 112. X and Y values are retrieved, wherein X equals the horizontal width of the line graph 402 and Y equals the vertical height of the line graph 402.

Also during step 606, X is divided by (T times P). Qi is the integer part of the quotient and Qr is the remainder part of the quotient. In step 606, if Qi equals zero, then the Build Line graph method 602 exits with an error because the width of the line graph 402 (in pixels) would be less than the number of datapoints to be displayed.

In step 608, an array of 1 . . . (T times P) forms are built. The array is called FormArray. In the current example, FormArray holds 30 forms.

Each form is built using well known functions from the windowing system 112. These forms are used to display the datapoints in the line graph 402. Each form contains the following information: bitmap, horizontal width, vertical width, horizontal offset, and vertical offset. A form's horizontal offset and vertical offset indicate the position of the form in a window relative to the line graph's 402 upper lefthand corner.

Also in step 608, the forms in the FormArray are initialized with a horizontal width of Qi pixels and a vertical height of Y pixels. All of the vertical offsets are initialized to zero. The horizontal offset of the form in the first element of the FormArray is initialized to zero. The horizontal offset of the form in the second element of the FormArray is initialized to Qi. The horizontal offset of the third element of the FormArray is initialized to 2 * Qi. The horizontal offset of the fourth element of the FormArray is initialized to 3 * Qi. The horizontal offsets of the remaining elements of the FormArray are initialized in a similar manner.

Such initialization in step 608 creates a line graph 402 having (T times P) forms whose sizes and shapes are identical. The forms have the same height as the line graph 402. The forms are horizontally adjacent to each other. An area, on the display screen 122, which is Qr pixels wide will be unused at the right edge of the line graph 402.

In step 610, all of the forms in the FormArray are cleared by initializing their pixels (in their bitmaps) to the background color of the line graph 402.

In step 612, the area on the display screen 122 devoted to the line graph 402 is cleared by displaying all of the cleared forms from the FormArray using well known functions from the windowing system 112.

2.2. Display Data Point

Figure 7:
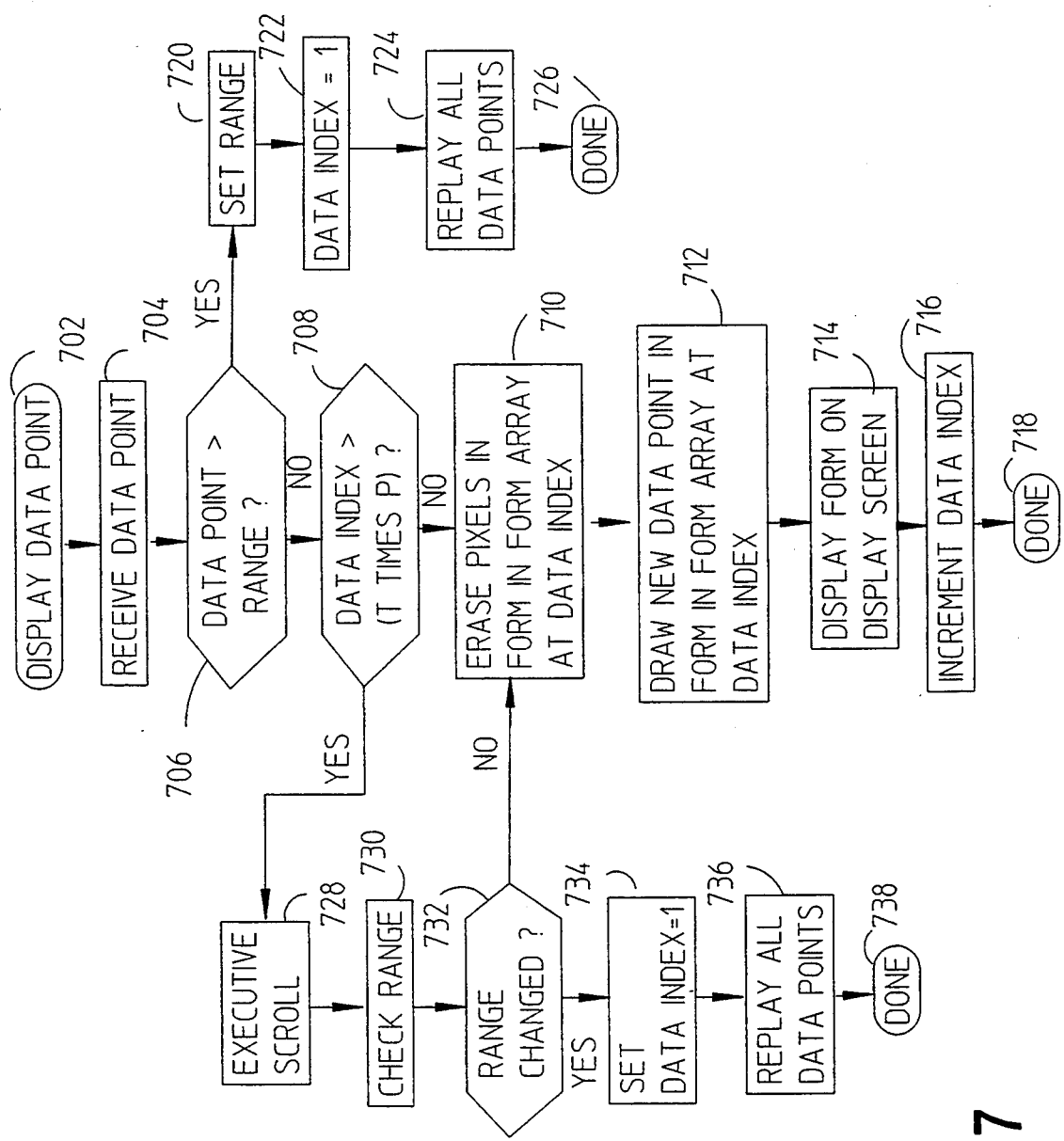
FIG. 7 illustrates a flowchart of a Display Data Point method 702 of the present invention.

FIG. 7 illustrates a Display Data Point method 702 of the line graph routines of the present invention. The Display Data Point method 702 is described below.

In step 704, a new datapoint is received and stored into the DataArray at the element corresponding to DataIndex.

In step 706, it is determined whether the value of the datapoint is greater than the value of Range. If the value of the datapoint is greater, then steps 720, 722, 724, and 726 are performed.

In step 720, Range is set to a value which is greater than the value of the new datapoint. Usually, it is set to the lowest value in a 10, 20, 50, 100, 200, 500, 1000, 2000, . . . sequence which is greater than or equal to the new datapoint.

In step 722, DataIndex is set to 1.

In step 724, all the datapoints (including the newly received datapoint) in the line graph 402 are redisplayed. In other words, the Display Data Point method 702 is performed for each of the datapoints in the line graph 402. Following step 724, the Display Data Point method 702 is complete.

Steps 720, 722, 724, and 726 effectively redisplay all of the datapoints with the new Range as a scale factor. This is known as autoscaling because it ensures that none of the datapoints will be above the top of the line graph 402.

If, in step 706, the value of the datapoint is not greater than Range, then step 708 is performed. In step 708, it is determined whether the value of DataIndex is greater than (T times P). If DataIndex is greater, then steps 728 through 738 are performed.

In step 728, a Scroll method 802 is performed. The Scroll method 802 is described in detail below.

In step 730, the integers in elements 1 through the element corresponding to (DataIndex−1) of the DataArray are examined to determine whether Range may be lowered. The value of Range is lowered if possible. Specifically, Range is set to the lowest value which is still greater than all of the datapoints. Usually, Range is set to a value in a 10, 20, 50, 100, 200, 500, 1000, 2000, . . . sequence.

In step 732, it is determined whether the value of Range was changed in step 730. If Range was changed, then steps 734, 736, and 738 are performed. Steps 734, 736, and 738 are similar in operation to steps 722, 724, and 726 (which are described above). Steps 734, 736, and 738 effectively redisplay all of the datapoints with a new Range as the scale factor. These steps are performed because a peak datapoint may have been discarded during the operation of the Scroll method 802.

If, in step 730, the value of Range was not changed, then in step 710 the pixels in the form in the FormArray element DataIndex are erased. The form is erased by setting all of its pixels to the background color of the line graph.

In step 712, the new datapoint is drawn in the form which was erased above in step 710. It is drawn by coloring the pixel(s) whose vertical distance from the bottom of the form is the same ratio to the form's total height as the ratio of the value of the new datapoint is to Range. Any pixels below the pixels just colored are also colored. This creates a line graph with a solid color fill between the datapoints being displayed and the horizontal axis. Numerous other types of displays (such as solid or dashed lines) are possible.

In step 714, well known functions from the windowing system 112 are used to cause the form corresponding to DataIndex to be displayed on the display screen 122. Displaying only a single form involves moving far fewer pixels to the display screen 122 than would be necessary if the entire line graph 402 were re-displayed on the display screen 122 each time that a datapoint was added.

In step 716, the value of DataIndex is incremented by one.

2.3. Scroll

Figure 8:
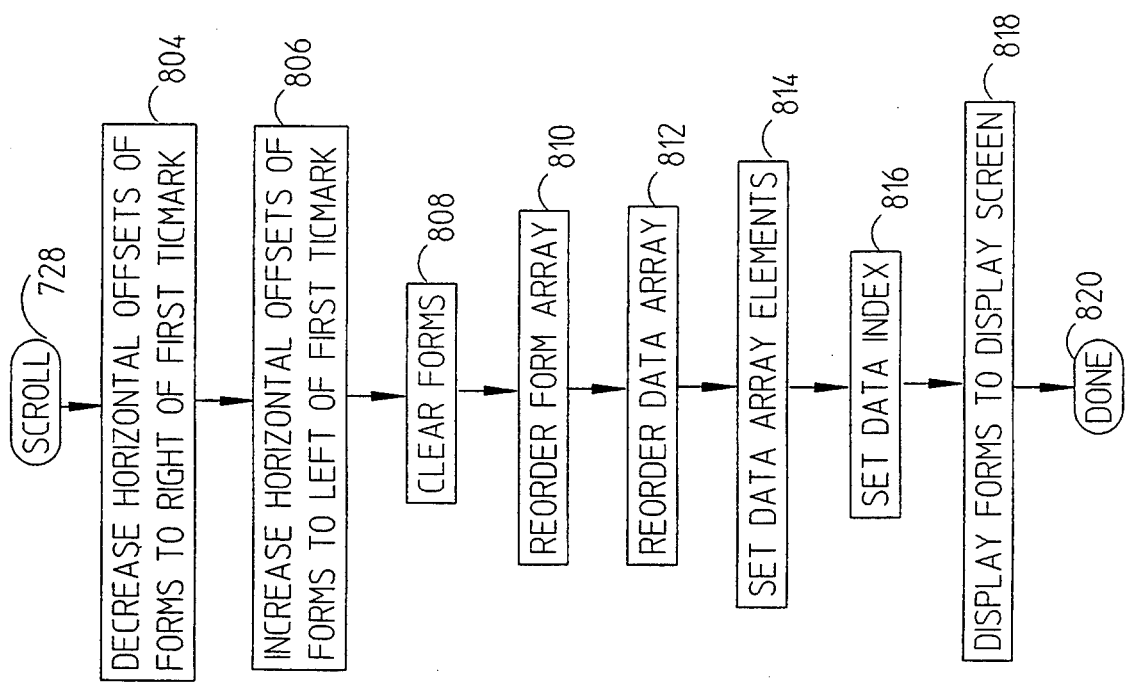
FIG. 8 illustrates a flowchart of a Scroll method 728 of the present invention.

FIG. 8 illustrates a flowchart of the Scroll method 728. The Scroll method 728 was briefly discussed above.

Figure 5B:
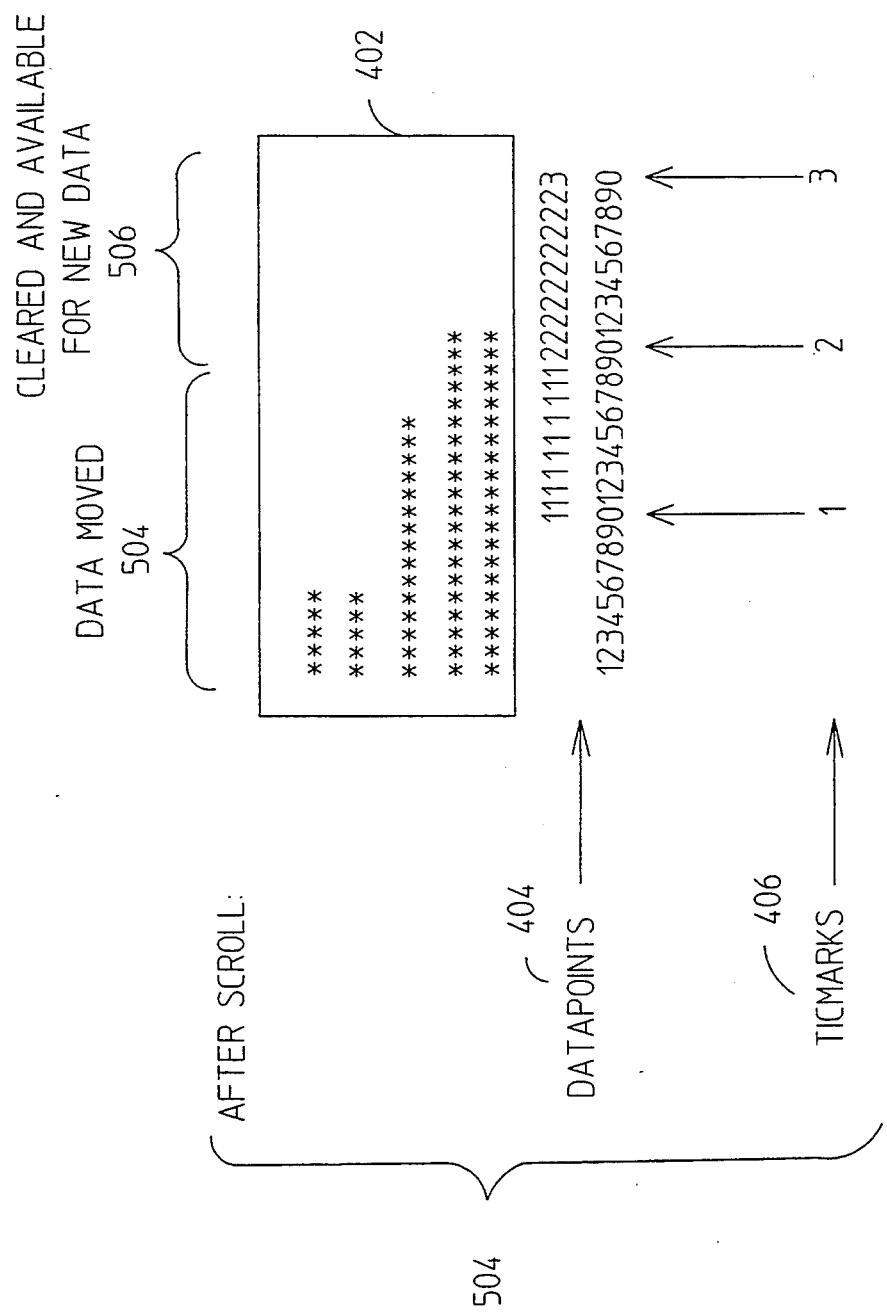
FIG. 5B illustrates the line graph 402 after scrolling 504.

The Scroll method 728 is used to horizontally scroll the line graph 402. The operation of the Scroll method 728 is generally described below with reference to FIGS. 5A and 5B. FIG. 5A illustrates a line graph 402 before scrolling 502. FIG. 5B illustrates the line graph 402 after scrolling 504. When the line graph 402 is horizontally scrolled, the datapoints 502 from the first ticmark to the origin of the line graph 402 are discarded and all other datapoints 504 are moved to the left by the distance between the ticmarks. The datapoints 506 to the right of the next-to-highest ticmark are cleared. Note that the scrolled line graph 402 contains historical information. Thus, the line graph 402 may be used to graphically illustrate past and present information.

Conventionally, scrolling is expensive in terms of the amount of computer resources consumed. However, scrolling according to the line graph routines of the present invention consumes less than 1/P of the computer resources (relative to conventional methods, wherein line graphs are scrolled left by only one datapoint at a time). Additionally, some conventional scrolling methods first erase the line graph and then plot the datapoints. However, such conventional methods retain no historical information.

Thus, the Scroll method 728 of the line graph routine is an improvement over conventional scrolling methods. The Scroll method 728 shall now be described in detail.

In step 804, the horizontal offsets of all forms to the right of the first ticmark are decreased by (P times Qi). This causes the forms to be displayed in a different part of the line graph 402 the next time that they are re-displayed on the display screen 122. This does not alter the current display on the display screen 122. Referring to FIGS. 5A and 5B, for example, this causes the forms which currently display datapoints 11 . . . 30 to be moved to the positions 1 . . . 20.

In step 806, the horizontal offsets of all of the forms from the first ticmark to the left edge of the line graph are increased by (P times (T−1) times Qi). Referring to FIGS. 5A and 5B, for example, this causes the forms which display datapoints 1 . . . 10 to be moved to the positions 21 . . . 30.

In step 808, all forms moved in step 806 are cleared. This is done by setting all of their pixels to the line graph background color.

In step 810, the elements in the FormArray are reordered by removing and saving the first P elements. Then, the remaining elements are shifted toward the front of the FormArray by P spaces each. Then, the saved elements are placed (in order) at the end of the FormArray. This will place the forms in the FormArray in order of increasing horizontal offset.

In step 812, the DataArray is reordered in the same manner as described for the FormArray in step 810. This leaves each element of the DataArray in the same relative position as its corresponding form in the FormArray.

In step 814, the integer values of the last P elements in the DataArray are set to nil. These datapoints correspond to the erased forms 506.

In step 816, DataIndex is set to (P times (T−1)). This is the index of the leftmost cleared form and datapoint.

In step 818, well known functions from the windowing system 112 are used to display all of the forms on the display screen 122. This updates the display screen 122.

As noted above, the line graph routines of the present invention are directly applicable to other types of graphs. For example, the line graph routines may be used (with little modification) to display information in bar charts. According to this use of the line graph routines, each bar in the bar chart would be contained in a single form.

3. Gauge Displays

The gauge display routines of the present invention simulate a gauge on the computer screen 122. The present invention also displays information in the gauge. The gauge display routines include a build gauge routine, an update gauge routine, and an initialize gauge routine.

Figure 9A:
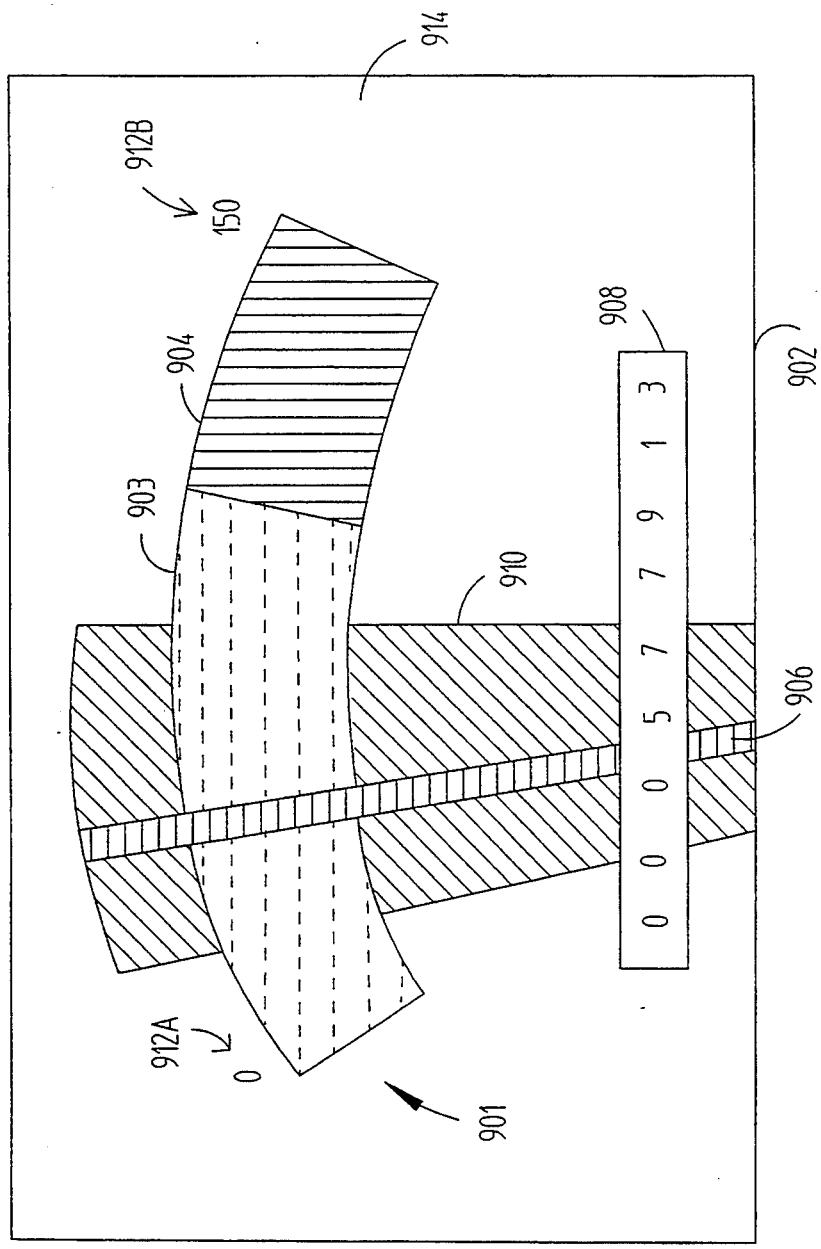
FIG. 9A illustrates an example of a gauge which is simulated by the present invention.
Figure 9B:
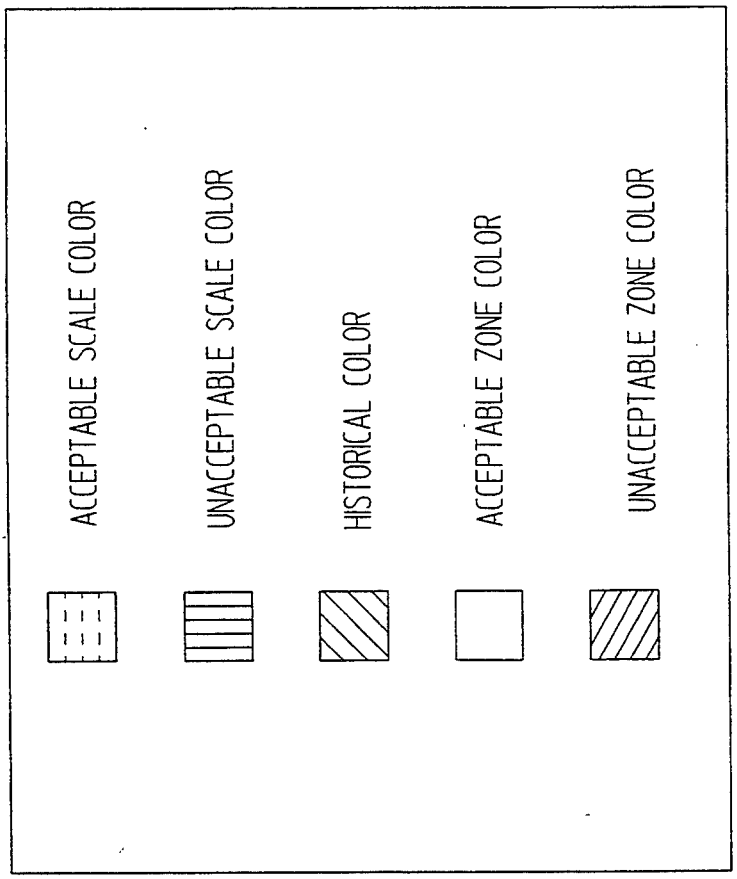
FIG. 9B illustrates a legend of colors found in a gauge.

FIG. 9A illustrates an example of a gauge 902 which is simulated by the present invention. FIG. 9B illustrates a legend of colors found in the gauge 902.

The gauge 902 includes a scale 901, a needle 906, a meter 908, a shadow 910, and a background color 914.

The scale 901 has an acceptable zone 903 which is identified by an acceptable scale color, such as green. The scale 901 also has an unacceptable zone 904 which is identified by an unacceptable scale color, such as red. Scale digits 912 identify the end points of the scale 901.

The needle 906 indicates a current value of a quantity being monitored. For example, the quantity being monitored may be the error rate of a local area network (LAN). According to this example, the needle 906 would indicate the current error rate of the LAN.

The meter 908 displays an accumulated value of the quantity being monitored. According to the current example, the meter 908 would display the total number of errors of the LAN.

The shadow 910 shows the historical minimum and maximum values of the quantity being monitored.

The background color 914 indicates whether the needle 906 has ever been in the unacceptable zone 904 of the scale 901. If the needle 906 has never been in the unacceptable zone 904, then the background color 914 is set to an acceptable zone color (such as white). This is the status in FIG. 9A. However, if the needle 906 has ever been in the unacceptable zone 904, then the background color 914 is set to an unacceptable zone color (such as pink).

The gauge 901 is displayed on the computer display screen 122. According to the preferred embodiment of the present invention, the gauge 901 is displayed in a window 204.

FIG. 11 illustrates a partial flowchart of the application program 104 which uses the graph routines 106 of the present invention to simulate and display data in a gauge 902.

In step 1102, the application program 104 calls the build gauge routine of the present invention. The build gauge routine simulates the gauge 902 on the display screen 122. Note that the application program 104 may have provided the windowing system 112 with the name of the build gauge routine. The windowing system 112 may then have caused the application program 104 to invoke the build gauge routine (by passing the name of the build gauge routine to the application program 104).

In step 1104, the application program 104 performs some application-specific processing.

In step 1106, if the application-specific processing produced data to be displayed in the gauge 902, then the application program 104 executes step 1112. In step 1112, the application program 104 calls the update gauge routine to display the data in the gauge 902. Following step 1112, the application program 104 may loop back to step 1104.

In step 1108, if the application-specific processing did not produce a request to initialize the gauge 902, then the application program 104 continues in a manner which is application-specific (and which is not specified in FIG. 11). The application program 104, for example, may loop back to step 1104.

In step 1108, if the application-specific processing produced a request to initialize the gauge 902, then the application program 104 executes step 1114. In step 1114, the application program 104 calls the initialize gauge routine to initialize the gauge 902. The request to initialize the gauge 902 may have come from an operator. Following step 1114, the application program 104 may loop back to step 1104.

The build gauge routine, update gauge routine, and initialize gauge routine are described further in the following sections.

3.1. Build Gauge Routine

According to the present invention, the gauge 902 is generated as follows. First, pixel patterns are written on several forms. Second, the forms are combined.

The manner in which the forms are combined to generate the gauge 902 is similar to the manner in which transparencies are overlayed to generate an image using an overhead projector.

The following global variables must be specified by the application program 104 which is using the gauge display routines of the present invention.

First, Dn must be specified. Dn is the number of digits in the meter 908. If Dn is zero, then the gauge display routines will not display the meter 908.

Second, Sl must be specified. Sl is the scale digit 912A at the left end of the scale 901. Sl is usually set to zero.

Third, Sr must be specified. Sr is the scale digit 912B at the right end of the scale 901. The range of data values which can be displayed by the gauge 902 is Sl through Sr.

Fourth, Rl must be specified. Rl is the leftmost part of the unacceptable zone 904 on the gauge scale 901. Thus, if Sl=0, Sr=10, Rr=10, and Rl=7, the leftmost 70% of the scale 901 will be acceptable and the remaining 30% of the scale 901 will be unacceptable (the left end of the unacceptable zone 904 is at the 70% point). In this example, the entire scale 901 will be acceptable if Rl> =Sr.

Fifth, Rr must be specified. Rr is the rightmost part of the unacceptable zone 904 on the gauge scale 901. Thus, if Sl=0, Sr=10, Rl=0, and Rr=7, the leftmost 70% of the scale 901 will be the unacceptable zone 904 and the remaining 30% of the scale 901 will the acceptable zone 903 (the right-end of the unacceptable zone 904 is at the 70% point). In this example, the entire scale will be unacceptable if Rr> =Sr.

Rr and Rl may be used in combination. If Sl=0, Sr=10, Rl=2, and Rr=7, then the leftmost 20% of the scale 901 and the rightmost 30% of the scale 901 will be acceptable and the remainder of the scale 901 will be unacceptable. If Sl=0, Sr=10, Rl=7, and Rr=2, the left most 20% of the scale 901 and the rightmost 30% of the scale 901 will be unacceptable and the remainder of the scale 901 will be acceptable.

Sixth, N must be specified. N is the data value which determines the position of the needle 906. N is usually zero for initialization.

Seventh, D must be specified. D is the current reading of the meter 908. D is usually zero for initialization.

Figure 12:
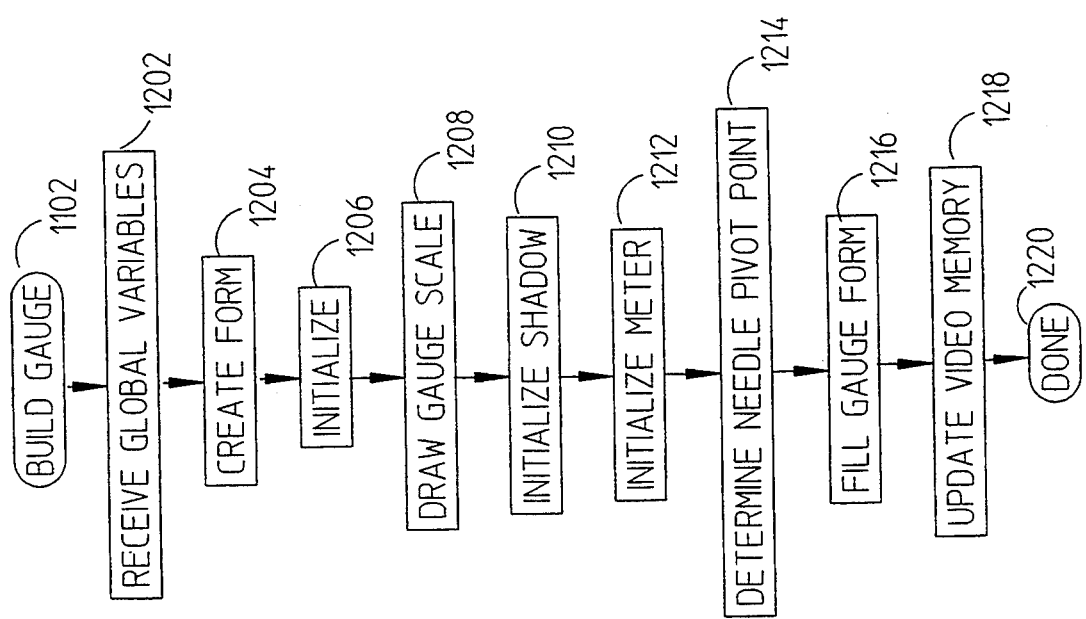
FIG. 12 illustrates a flowchart for a build gauge routine of the present invention.

FIG. 12 illustrates a flowchart for the build gauge routine 1102 of the present invention.

In step 1202, the build gauge routine 1102 receives the global variables (described above) from the application program 104.

In step 1204, the build gauge routine 1102 creates a scaleForm 1002, shadowForm 1004, digitsForm 1006, and gaugeForm. These forms are initialized in the following steps. These forms cannot be initialized until the size of the gauge 902 is known.

In step 1206, the build gauge routine 1102 initializes the following local variables.

First, currentReading is initialized. currentReading represents the current position of the needle 906. currentReading is initialized to N.

Second, minReading is initialized. minReading represents the leftmost position reached by the needle 906 and therefore the leftmost edge of the shadow 910. minReading is initialized to N.

Third, maxReading is initialized. maxReading represents the rightmost position reached by the needle 906 and therefore the rightmost edge of the shadow 910. maxReading is initialized to N.

Fourth, currentDigits is initialized. currentDigits represents the current reading of the meter 908. currentDigits is initialized to D.

Various other local variables are initialized at this point, such as a local variable for turning on or off the shadow 910, a local variable for turning on or off the meter 908, a local variable for turning on or off the scale digits 912, and local variables for setting the colors of the gauge 902. For illustrative purposes, we shall assume that these local variables are set such that the shadow 910, the meter 908, and the scale digits 912 are displayed.

Also in step 1206, the build gauge routine 1102 determines the size of the gauge 902 in pixels. The size of the gauge 902 is provided by the windowing system 112. The size of the gauge 902 is specified by X and Y, where X is the horizontal width of the gauge 902 in pixels and Y is the vertical height of the gauge 902 in pixels.

In step 1208, the build gauge routine 1102 draws the scale 901 and the scale digits 912 on the scaleForm 1002. The build gauge routine 1102 also sets the background color 914. The build gauge routine 1102 uses the values of currentReading, Sl, St, Rl, and Rr to determine the scale colors and the background color 914. The size of the scaleForm 1002 is X by Y pixels. The offset of the scaleForm 1002 is 0. FIG. 10A illustrates an example of the scaleForm 1002.

Figure 10B:
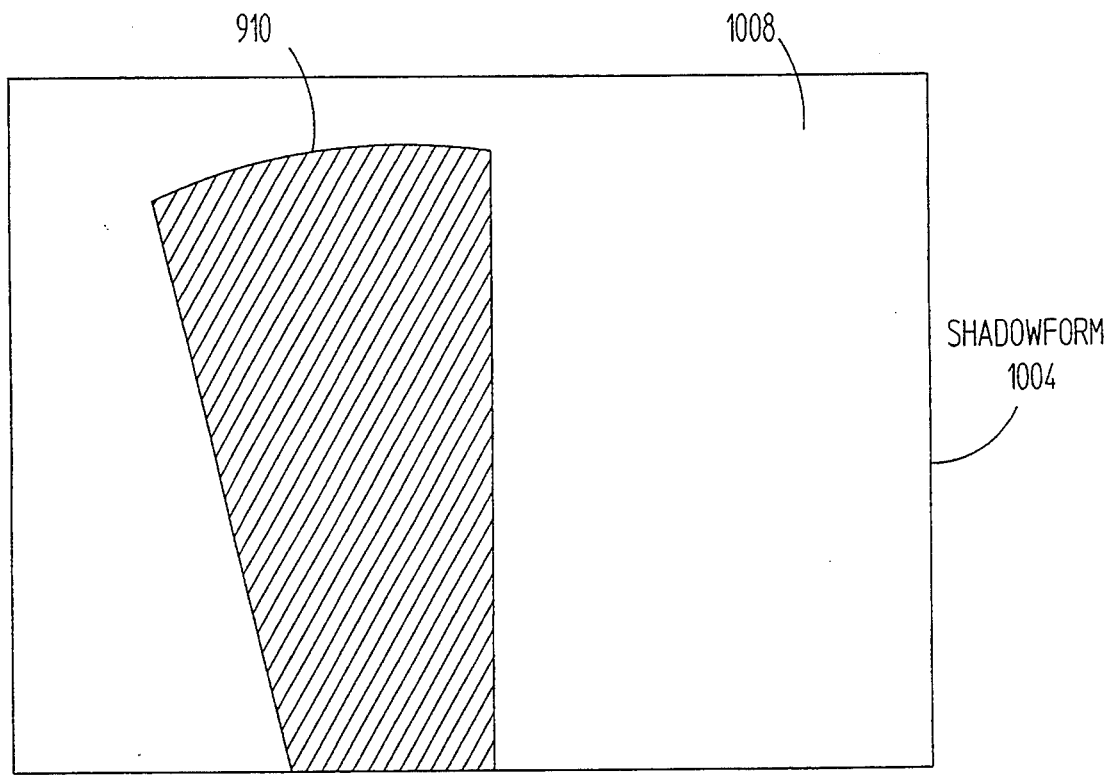
FIG. 10B illustrates an example of a shadowForm.

In step 1210, the build gauge routine 1102 initializes the shadowForm 1004 to X by Y pixels. The shadowForm 1004 contains the shadow 910. The build gauge routine 1102 clears the shadowForm 1004 because the needle 906 has not yet moved. The offset of the shadowForm 1004 is zero. FIG. 10B illustrates an example of the shadowForm 1004 where the needle 906 has moved.

Figure 10C:
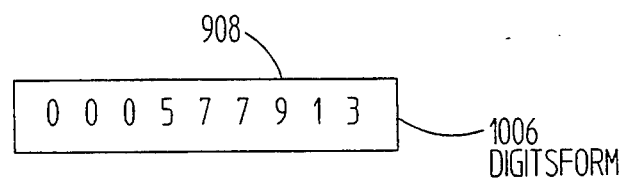
FIG. 10C illustrates an example of a digitsForm.

In step 1212, the build gauge routine 1102 initializes the digitsForm 1006. The digitsForm 1006 only contains the meter 908. Thus, the size of the digitsForm 1006 is determined by the number of digits to be displayed. The build gauge routine 1102 writes the digits corresponding to D on the digitsForm 1006. The build gauge routine 1102 uses X and Y to determine the offset of the digitsForm 1006. Specifically, the offset is a percentage from the top of the scaleForm 1002. The value of the percentage is implementation dependent. FIG. 10C illustrates an example of the digitsForm 1006. Note that the legend in FIG. 9B applies to FIGS. 10A, 10B, and 10C.

In step 1214, the build gauge routine 1102 uses X and Y to compute and save the pivot point of the needle 906. In the preferred embodiment of the present invention, the pivot point is below the gauge 902 (approximately 3 times Y below the gauge 902) for aesthetic purposes. The build gauge routine 1102 also computes the positions of the tip of the needle 906 at 0%, 1%, 2%, . . . , 100% of full scale. These positions are saved in an 101-element array.

These points are pre-computed in order to save computation time when the gauge 902 is updated. When either the needle 906 or the shadow 910 are drawn, any required positions are converted to the nearest integer percent of full scale and the stored pixel locations are used.

In step 1216, the build gauge routine 1102 fills the gaugeForm by combining the contents of the scaleForm 1002, shadowForm 1004, and digitsForm 1006 and by drawing the needle 906.

Specifically, the build gauge routine 1102 first performs a logical-AND operation with the contents of the scaleForm 1002 and the shadowForm 1004. The result of this logical-AND operation is placed in the gaugeForm.

The shadowForm 1004 contains a background 1008 which is defined such that the logical-AND between the background 1008 and the scaleForm 1002 yields the contents of the scaleForm 1002. In other words, the pixels in the background 1008 are essentially logical "1"s. The pixels in the shadow 910 are not logical "1"s. Thus, the logical-ANDing of the shadow 910 and the scaleForm 1002 produces a darkened area in the gaugeForm corresponding to the shadow 910.

Second, the build gauge routine 1102 draws the needle 906 on the gaugeForm.

Third, the build gauge routine 1102 overlays the digitsForm 1006 on to the gaugeForm such that the pixels of the digitsForm 1006 replaces the corresponding pixels of the gaugeForm.

Following step 1216, the gaugeForm is complete. With regard to the gauge display routines of the present invention, the gaugeForm is the only form known to the windowing system 112. The gaugeForm holds the pixel pattern which is to be displayed when the windowing system 112 updates the gauge 902.

In step 1218, video memory is updated by displaying the gaugeForm built in the previous steps. This is usually done by executing windowing system code.

Note that, by maintaining the gauge 902 in multiple forms, the present invention reduces the computational time necessary to update the gauge 902. For example, to update the gauge 902, usually only the needle 906 and the meter 908 need to be changed. Thus, it is not necessary to modify the scale 901, scale digits 912, and background color 914 in the scaleForm 1002. Also, it is not necessary to modify the shadow 910 in the shadowForm 1004 (this is particularly true once the quantity to be monitored has settled). Rather, only the meter 908 in the digitsForm 1006 and the needle 906 in the gaugeForm need to be modified.

Although described herein with regard to a gauge 902, the present invention is applicable to any computer-simulated display wherein elements of the computer-simulated display are stored in multiple forms, and the computer-simulated display is formed by overlaying the multiple forms.

3.2. Update Gauge Routine

Figure 13:
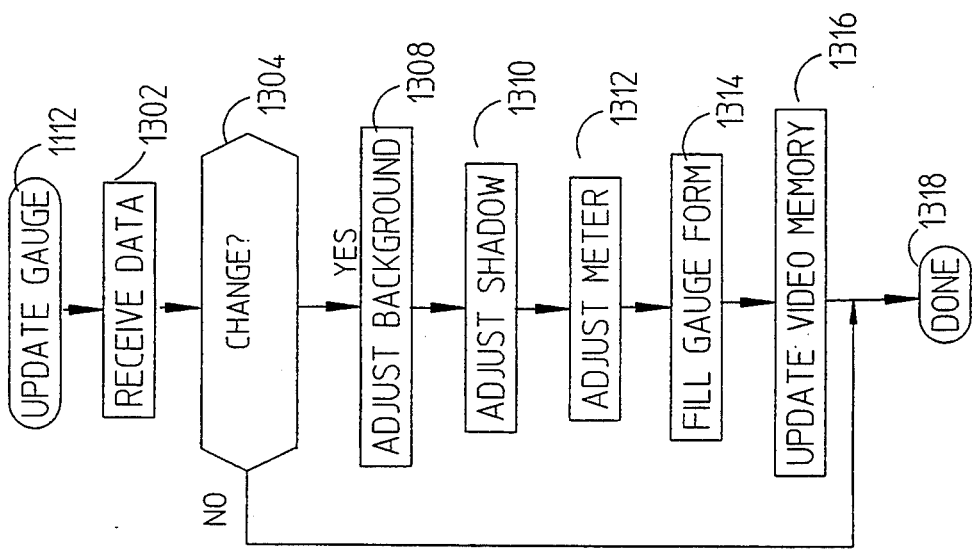
FIG. 13 illustrates a flowchart for an update gauge routine of the present invention.

FIG. 13 illustrates a flowchart for the update gauge routine 1112 of the present invention.

In step 1302, the update gauge routine 1112 receives new values of N and D.

In step 1304, the update gauge routine 1112 determines whether N equals currentReading and D equals currentDigits. If N equals currentReading and D equals currentDigits, then the update gauge routine 1112 exits since the gauge 902 need not be updated.

If N does not equal currentReading and/or D does not equal currentDigits, then the update gauge routine 1112 moves to step 1308.

In step 1308, the update gauge routine 1112 determines whether the value of N places the needle 906 over the unacceptable zone 904 of the scale 901. If the value of N places the needle 906 over the unacceptable zone 904, and if the background color 914 of the scaleForm 1002 is not already set to the unacceptable zone color, then the update gauge routine redraws the scaleForm 1002 with the unacceptable zone color as the background color 914.

In step 1310, the update gauge routine 1112 sets currentReading equal to N. Then, the update gauge routine 1112 determines whether currentReading is less than minReading or whether currentReading is greater than maxReading. If either currentReading is less than minReading or currentReading is greater than maxReading, then the update gauge routine 1112 updates the shadow 910 by first updating minReading or maxReading. Then, the update gauge routine 1112 redraws the shadowForm 1004 using the values of minReading and maxReading to determine the limits of the shadow 910.

In step 1312, the update gauge routine 1112 determines whether currentDigits is equal to D. If currentDigits is not equal to D, then the update gauge routine updates the digitsForm 1006 to display D. If the integer value of D has more than Dn digits, then the update gauge routine 1112 displays all '9' digits in the meter 908. In step 1312, the update gauge routine 1112 also sets currentDigits equal to D.

In step 1314, the update gauge routine 1112 fills the gaugeForm by combining the contents of the scaleForm 1002, shadowForm 1004, and digitsForm 1006 and by drawing the needle 906. Step 1314 is similar to step 1216.

In step 1316, the video memory is updated by displaying the gaugeForm built in the previous steps. Step 1316 is similar to step 1218.

3.3. Initialize Gauge Routine

Initializing a gauge 902 is usually initiated by an operator, although it could be done under program control. It is assumed that the windowing system 112 gives the operator some way to indicate a desire to clear the gauge 902 and also to provide default values for the global variables (discussed above).

Figure 14:
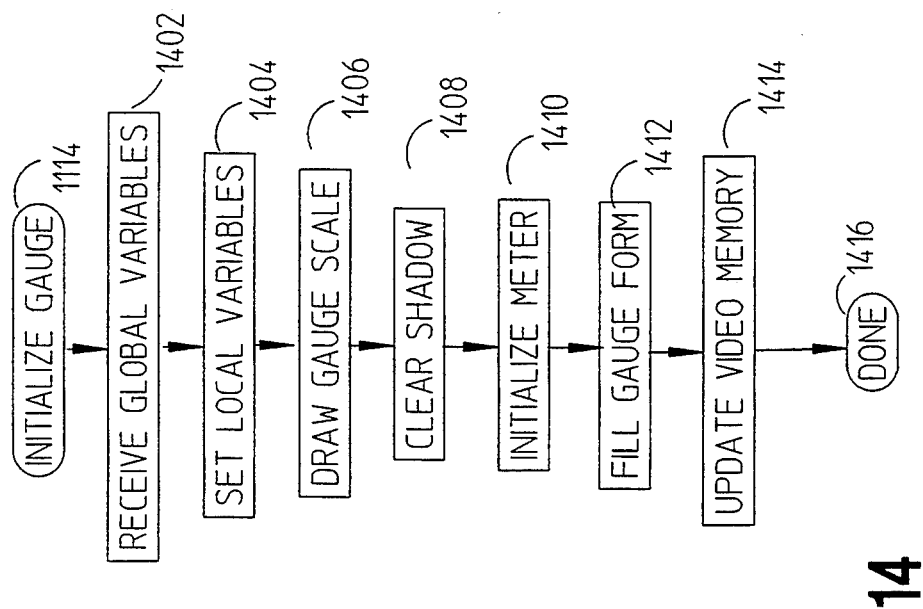
FIG. 14 illustrates a flowchart for an initialize gauge routine of the present invention.

FIG. 14 illustrates a flowchart for the initialize gauge routine 1114 of the present invention.

In step 1402, the initialize gauge routine 1114 receives the global variables.

In step 1404, the initialize gauge routine 1114 sets the local variables as follows. currentReading is set to N. minReading is set to N. maxReading is set to N. currentDigits is set to D.

In step 1406, the initialize gauge routine 1114 repaints the scaleForm 1002. The background color 914 is set to the unacceptable zone color if the value of N places the needle 906 in the unacceptable zone 904 of the scale 901.

In step 1408, the initialize gauge routine 1114 clears the shadowForm 1004.

In step 1410, the initialize gauge routine 1114 updates the digitsForm 1006 such that the meter 908 displays D.

In step 1412, the initialize gauge routine 1114 fills the gaugeForm by combining the contents of the scaleForm 1002, shadowForm 1004, and digitsForm 1006 and by drawing the needle 906. Step 1412 is similar to step 1216.

In step 1414, the video memory is updated by displaying the gaugeForm built in the previous steps. Step 1414 is similar to step 1218.

4. Pie Charts

The pie chart routines of the present invention simulate a pie chart on the computer screen 122. The pie chart routines also display information in the computer screen 122. The pie chart routines include a build pie chart routine and an update pie chart routine.

Figure 15:
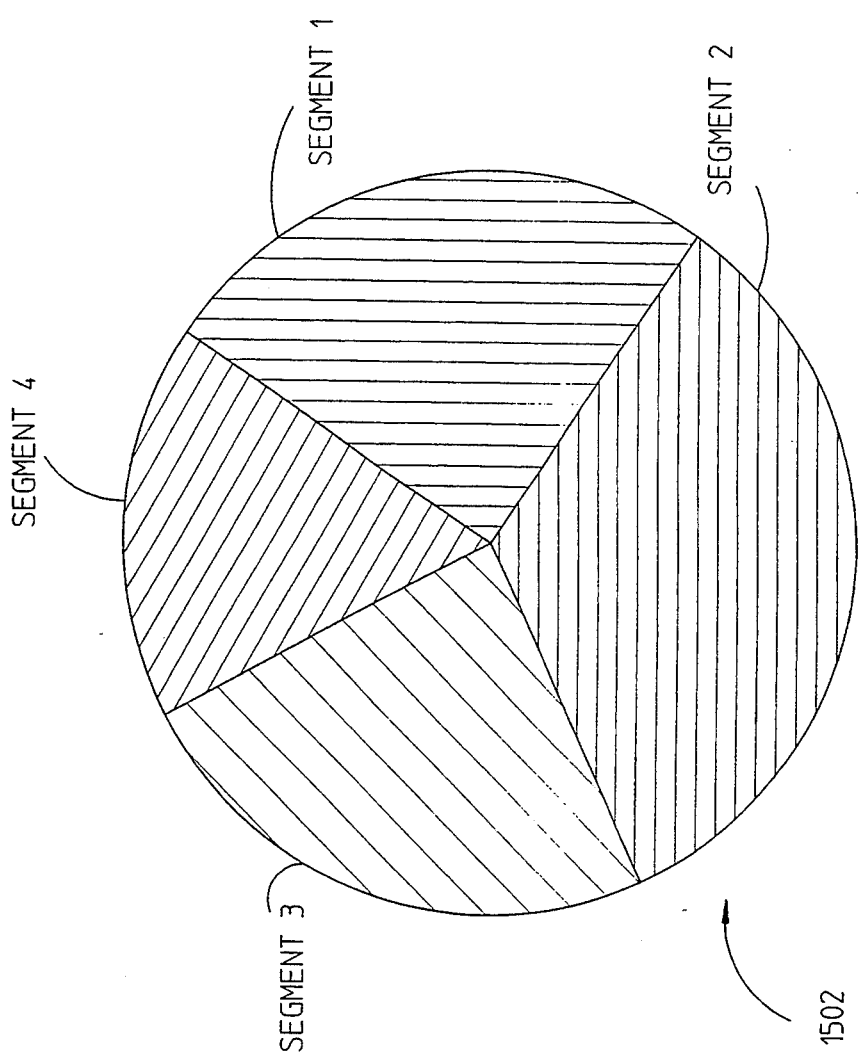
FIG. 15 illustrates an example of a pie chart according to the present invention.

FIG. 15 illustrates an example of a pie chart 1502 according to the present invention. The pie chart 1502 includes 4 segments. Each segment is filled with a different color or grey scale. Each segment is identified by a label (that is, Segment 1, Segment 2, Segment 3, and Segment 4).

According to the present invention, the pie chart 1502 is built by writing pixel patterns on two forms. A circleForm holds a circle which represents the outline of the pie chart 1502. The contents of the circleForm are copied to a pieChartForm. Straight lines, representing boundaries between segments, are then drawn in the pieChartForm. The resulting segments are colored and segment labels are written in the pieChartForm. In this manner, the pie chart 1502 is created.

The outline of the pie chart 1502 is saved in the circleForm because (1) the circle of the pie chart 1502 does not change after the pie chart 1502 is initialized, and (2) drawing the circle is computationally expensive. Thus, the present invention efficiently builds and updates pie charts.

The build pie chart routine and update pie chart routine are described in detail below.

4.1. Build Pie Chart Routine

Figure 16:
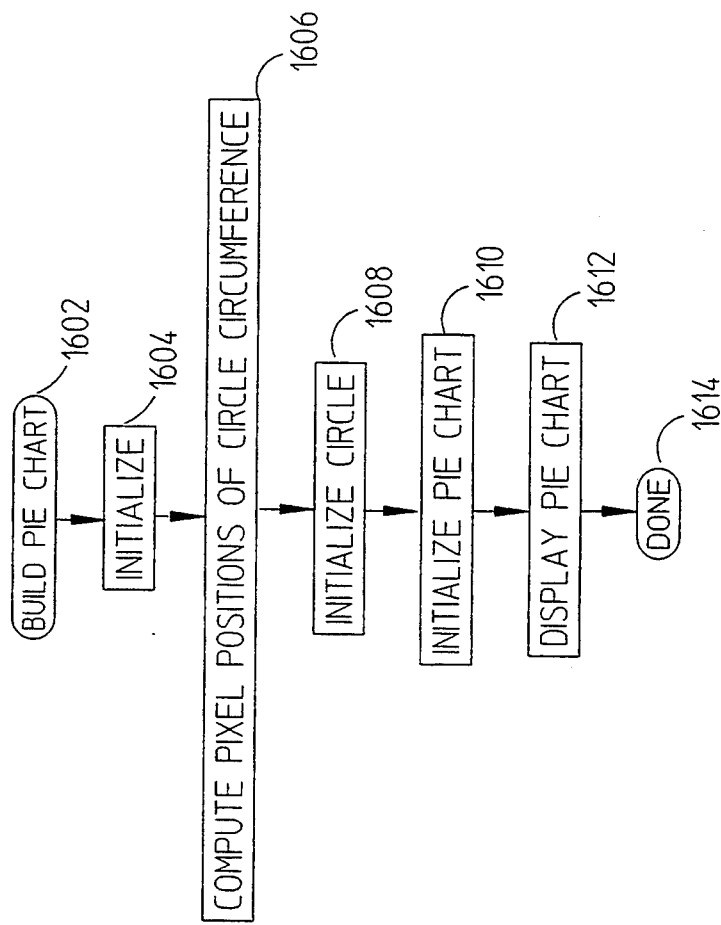
FIG. 16 illustrates a flowchart for a build pie chart routine of the present invention.

FIG. 16 illustrates a flowchart for the build pie chart routine 1602 of the present invention.

In step 1604, various initialization functions are performed. Specifically, the build pie chart routine 1602 creates the circleForm and the pieChartForm. Note that these forms cannot be initialized until the size of the pie chart is known (see below).

During step 1604, the build pie chart routine 1602 also initializes a number of local variables.

First, dataArray is initialized. dataArray is an array of numbers which give the data to be displayed in the pie chart. Normally, this is initialized to all zeros (that is, no data).

Second, labelArray is initialized. labelArray is an array of character strings which give the labels to be displayed with each pie segment. The elements in this array correspond with the elements in the dataArray. For example, the characters in the first element of the labelArray will be displayed with the segment which represents the first element in the dataArray.

Third, colorArray is initialized. The colorArray is an array of color identifiers. The color identifiers correspond to colors which are used to paint the pie segments. The elements in the colorArray correspond with the elements in the dataArray. The manner in which the colors are specified is dependent upon the windowing system. Integers are commonly used.

The number of non-zero elements contained in the dataArray determine the number of segments in the pie array. Thus, if the dataArray has 5 non-zero elements, then the corresponding pie chart would have 5 segments.

Fourth, maxLabelLength is initialized. The maxLabelLength is the length of the longest label to be used to label an pie segment. This is used below to determine the radius of the pie chart.

Fifth, pointArray is initialized. The pointArray is an array of x,y positions. The x,y positions correspond to the pixel positions of the pie chart circumference. According to the preferred embodiment, the pointArray is actually initialized after the size of the pie chart is known. Alternatively, the pointarray may be precomputed during initialization if the size of the pie chart is predetermined and is known to never change.

Sixth, segmentCenterArray is initialized. The segmentCenterArray is an array of pointers into the pointArray. These pointers are used to draw label connectors to the pie segments.

Additional local variables may be initialized during step 1604. For example, local variables which control whether segment labels are displayed, which specify character fonts, which control the positions of the segment labels (radially around the pie chart or in columns along the vertical edges of the form), and which control the colors of the labels (match the segment color or all in a specified color) may be initialized during step 1604.

Also during step 1604, the build pie chart routine 1602 receives the size of the pie chart in pixels. This is provided by the code which implements the windowing system 112. The size of the pie chart is specified as an X, Y pair, where X is the horizontal width of the pie chart and Y is the vertical height of the pie chart.

In step 1606, the build pie chart routine 1602 uses the values X, Y, and maxLabelLength to compute the pixel position of the center of the circle and the pixel radius of the circle. The build pie chart routine 1602 then uses the computed center and radius to compute pixel positions of the circumference of the circle at 1% increments (that is, 3.6 degree increments). Thus, the build pie chart routine 1602 computes a total of 101 x-y positions at 0 degrees, 3.6 degrees, 7.2 degrees, . . . , 360 degrees. The build pie chart routine 1602 stores these x-y positions in the pointArray.

According to the present invention, the lines between the pie chart segments are drawn by rounding the data in the dataArray to the nearest 1% of the total and then drawing a line from the point given by the corresponding element in the pointArray to the center of the circle. The steps for performing this are described below.

In step 1608, the build pie chart routine 1602 initializes the circle of the pie chart by drawing, in the circleForm, straight lines between the positions stored in the pointArray. For example, a straight line is drawn in the circleForm between the first two positions stored in the pointArray. Another straight line is drawn between the second and third positions stored in the pointArray.

The circle of the pie chart is drawn according to the positions in the pointArray to ensure that the circumference of the circle precisely passes through all of the possible end points of the lines which define the edges of the pie segments. If this is not done, roundoff errors could cause the lines to miss or pass through the circle's circumference. This could cause the area-fill algorithms used to color the pie segments to 'leak' color into adjacent areas of the pie chart.

In step 1610, the build pie chart routine 1602 initializes the pie chart by copying the contents of the circleForm onto the pieChartForm.

In step 1612, the build pie chart routine 1602 updates the video memory by displaying the pieChartForm. This is done by executing windowing system code.

4.2. Update Pie Chart Routine

Figure 17A:
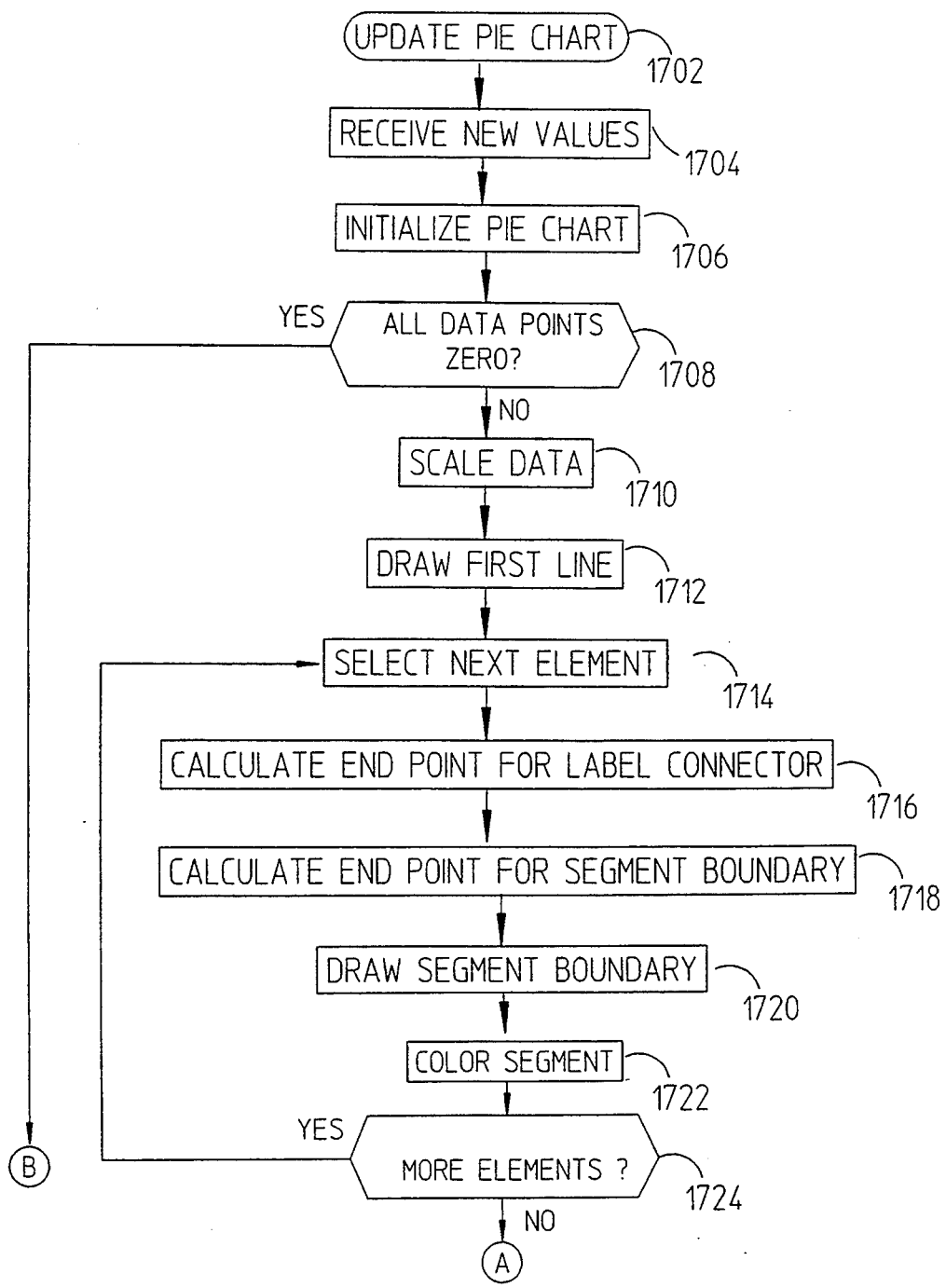
FIGS. 17A and 17B collectively illustrate a flowchart for an update pie chart routine of the present invention.
Figure 17B:
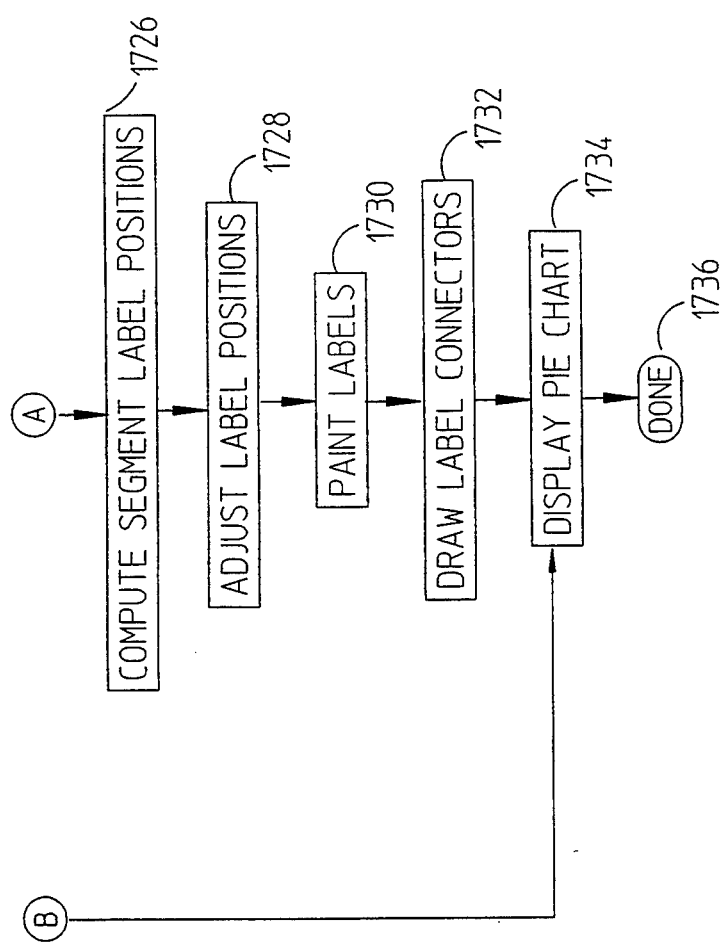

FIGS. 17A and 17B collectively illustrate a flowchart for the update pie chart routine 1702 of the present invention.

In step 1704, the update pie chart routine 1702 receives new values for display in the pie chart. The new values are stored in the dataArray.

In a first embodiment of the present invention, the contents of the labelArray and colorArray do not change after initialization. In a second embodiment of the present invention, the labelArray and colorArray may change after initialization. For example, in step 1704, the update pie chart routine 1702 may receive new values for the dataArray, labelArray, and colorArray.

Alternatively, the update pie chart routine 1702 may calculate the percentage size of each segment. Then, the update pie chart routine 1702 may update the labelArray with these percentages. For example, if a Segment 1 has 43% of the total, then Segment 1's label may be "Segment 1 (43%)".

In step 1706, the update pie chart routine 1702 copies the contents of the circleForm onto the pieChartForm. This initializes the pie chart.

In step 1708, the update pie chart routine 1702 determines whether all of the elements of the dataArray are zero. If all of the elements of the dataArray are zero, then the update pie chart routine 1702 jumps to step 1734 in order to display an empty pie chart. Otherwise, the update pie chart routine 1702 performs step 1710.

In step 1710, the update pie chart routine 1702 scales the elements in the dataArray so that the elements contain integers which sum to 100. For example, if the dataArray contains the following information before step 1706:

10, 7.5, 5, 2.5, 0.2, 25;

then the dataArray would contain the following information after step 1706:

20, 15, 10, 5, 0, 50.

In step 1712, the update pie chart routine 1702 draws the first segment boundary by drawing a line from the point defined in the first element of the pointArray to the center of the circle. Then, the update pie chart routine 1702 initializes a pointArray pointer to 1. The pointArray pointer points to elements in the pointArray. Thus, after it is initialized, the pointArray pointer points to the first element in the pointArray.

As indicated by steps 1714 and 1724, the update pie chart routine 1702 then performs steps 1716, 1718, 1720, and 1722 for each element in the dataArray. The element from the dataArray which is currently being processed is referred to as the 'current element.' The update pie chart routine 1702 performs steps 1716, 1718, 1720, and 1722 for the current element only if the current element is not zero.

In step 1716, the update pie chart routine 1702 computes the end point for the label connector for the pie segment corresponding to the current element. The label connector is a straight line which connects a segment with its label. This end point defines the position on the circumference of the pie chart to which the label connector is drawn.

Step 1716 is performed by dividing the value of the current element by 2 and rounding it, if necessary, to obtain an integer. The result is added to the value of the pointArray pointer. This result is stored into the element of the segmentCenterArray which corresponds to the element in the dataArray. For example, if dataArray contains 20, 15, 10, 5, 0, 50, then 11 will be stored in the segmentCenterArray when 20 is the current element (that is, 1+20/2). 29 will be stored in the segmentCenterArray when 15 is the current element (that is, 21+15/2). As noted above, the segmentCenterArray is used to look up the end points of the lines which connect the pie chart segments with their labels.

In step 1718, the update pie chart routine 1702 increments the pointArray pointer by the value of the current element. For example, if the dataArray contains 20, 15, 10, 5, 0, 50, then the pointArray pointer will be 21 when the current element is 20 (that is, 1+20). The pointArray pointer will be 36 when the current element is 15 (that is, 21+15).

In step 1720, the update pie chart routine 1720 fetches the value from the pointArray which corresponds to the pointArray pointer. The update pie chart routine 1720 then draws a line from that position to the center of the circle. This creates a pie segment which is bounded by two lines (which are radii of the circle) and by an arc of the pie chart circle. This pie segment corresponds to the current element from the dataArray.

In step 1722, the update pie chart routine 1720 colors the area inside the new pie segment with the color from the element of the colorArray which corresponds to the current element in the dataArray.

After steps 1716, 1718, 1720, and 1722 have been performed for each element in the dataArray, the update pie chart routine performs step 1726.

In step 1726, the update pie chart routine 1702 computes the optimum position of the segment label for each element in the dataArray which is not zero. The optimum position is vertically aligned with the center of the segment which it labels and horizontally to the left of the pie if the center of the segment is on the left side of the pie and to the right of the pie if the center of the segment is on the right side of the pie.

Step 1726 may have positioned some of the labels such that they overlap each other if there are several adjacent small pie segments. The update pie chart routine 1702 performs step 1728 to adjust the label positions. Step 1728 is performed first for the labels on the left side of the pie. Then, steps 1728 is performed for the labels on the right side of the pie. While performing step 1728, the update pie chart routine 1702 does not adjust the label positions if the label positions are already positioned correctly.

Starting from the bottommost label and proceeding in sequence to the topmost label, the update pie chart routine 1702 moves the label upwards if its bottom edge is below the bottom of the pie chart form or is below the top edge of the label directly preceding it.

Then, starting with the topmost label and proceeding in sequence to the bottommost label, the update pie chart routine 1702 moves the label downwards if its top edge is above the top of the pie chart form or is above the bottom edge of the label directly preceding it.

Note that the update pie chart routine 1702 is able to perform the above functions of step 1728 since it knows (1) the positions of the labels, and (2) the height of the labels.

If, after performing step 1728, the bottom edge of the bottommost label is below the bottom of the pie chart form, then there are too many pie segments to be properly labeled. It is the responsibility of the designer of the program which uses the pie chart to ensure that this condition does not occur by increasing the size of the pie chart or by reducing the number of datapoints to be displayed.

In step 1730, the update pie chart routine 1702 paints the labels on the pieChartForm by using the positions defined at the end of step 1728 and by using the character strings from the labelArray.

In step 1732, the update pie chart routine 1702 draws lines which connect the labels to their respective pie segments (that is, the label connectors). These lines extend from the center of the arc of each pie segment (obtained by using the corresponding value in the segmentCenterArray to index into the pointArray) to the edge of the label (left or right) which is nearest to the pie chart.

In step 1734, the update pie chart routine 1702 updates the video memory by displaying the pieChartForm. This is done by executing windowing system code.

5. Statistical Dashboard Display for Token Ring Networks

As noted above, the graph routines 106 of the present invention are useful in many applications. For example, the present invention may be used to implement a statistical dashboard display for a protocol analyzer 129 which monitors token ring networks. Features of the protocol analyzer 129 (other than its information display features) are well known to those with ordinary skill in the art.

The statistical dashboard display of the present invention displays numerous token ring parameters. These parameters are displayed for each sample period. These parameters are acquired by the protocol analyzer 129 and passed to the graph routines 106 of the present invention. These parameters are listed in Table 1, below. Table 1 also lists the formats in which the parameters may be displayed. In Table 1, L stands for line graph, T stands for table, G stands for gauge, B stands for bar chart, and P stands for pie chart.

Table 1 also provides a brief description of each of the token ring parameters. These parameters are further described in many publically available documents, such as the *IBM Token-Ring Network Architecture Reference* (1st Edition, 1986), which is herein incorporated by reference in its entirety.

TABLE 1

| Parameter | Disp. Type | Description |
|---|---|---|
| Utiliz. % | LT | The network traffic as a percentage of the maximum possible network traffic. |
| Utiliz. fr | LT | The network traffic in frames/sec. |
| Utiliz. KB | LT | The network traffic in kilobytes/sec. |
| MAC frames | LT | The number of Media Access Control (MAC) frames/sec seen on the network. MAC frames are used to control and manage the network. |
| MAC Bytes | LT | The number of bytes/sec in MAC frames seen on the network. |
| Tokens | LT | The number of tokens/sec seen on the network. |
| Errors | LT | The number of MAC Isolating Error |

TABLE 1-continued

| Parameter | Disp. Type | Description |
|---|---|---|
| | | Counts and MAC Non-Isolating Error Counts frames/sec seen on the network. This may be less than the number of errors seen on the network because a MAC frame may report more than one error. |
| Purge frames | LTG | The number of MAC Ring Purge frames/sec seen on the network. |
| Beacon frames | LTG | The number of MAC Beacon frames/sec seen on the network. |
| Claim token fr | LTG | The number of MAC Claim Token frames/sec seen on the network. |
| Soft error fr | LTG | The number of MAC Report Soft Error frames/sec seen on the network. |
| Bytes/fr | LT | The average number of bytes/frame in the traffic on the network. |
| # of Stations | LTG | The number of active stations detected in the ring during the most recent Neighbor Notification Sequence. |
| Broadcast fr | LT | The number of frames/sec sent to the BROADCAST address. |
| Multicast fr | LT | The number of frames/sec sent to MULTICAST addresses. |
| Routing L−>L | LTP | The number of source-routed frames sent between local (on-ring) addresses per second. |
| Routing L−>R | LTP | The number of source-routed frames sent from a local address to a remote (off-ring) address per second. |
| Routing R−>L | LTP | The number of source-routed frames sent from remote to local addresses per second. |
| Routing R−>R | LTP | The number of source-routed frames, seen on the ring, which were sent between remote addresses. |
| Line errors | LT | The number of Line Errors/sec reported in MAC Isolating Error Count frames. Line Errors are usually frames whose bits have been corrupted by noise, collisions or faulty hardware/software. |
| Internal errs | LT | The number of Internal Errors/sec reported in MAC Isolating Error Count frames. Internal Errors are usually caused by a malfunctioning station on the ring. |
| Burst errors | LT | The number of Burst Errors/sec reported in MAC Isolating Error Count frames. Burst Errors are short periods of time when there is no signal on the network. |
| A/C errors | LT | The number of A/C Errors/sec reported in MAC Isolating Error Count frames. A/C Errors are usually the result of a malfunctioning Active Monitor (ring controller). |
| Abort errors | LT | The number of Abort Delimiter Transmitted Errors/sec reported in MAC Isolating Error Count frames. These errors are usually the result of corrupted tokens or frames. |
| Lost frm errs | LT | The number of Lost Frame Errors/sec reported in MAC Non-Isolating Error Count frames. Lost Frame Errors are frames which do not return to the sending station (after circling the ring). |
| Revr cong errs | LT | The number of Receiver Congestion Errors/sec reported in MAC Non-Isolating Error Count frames. Receiver Congestion Errors occur when a station discards a valid frame because it is unable to store the frame. |
| Frm copy errs | LT | The number of Frame Copied Errors/sec reported in MAC Non-Isolating Error Count frames. Frame Copied Errors occur when a station discovers that another station has copied a frame addressed to itself |
| Freq errors | LT | The number of Frequency Errors/sec reported in MAC Non-Isolating Error Count frames. A Frequency Error means that a station believes that the ring clock frequency is incorrect. |
| Token errors | LT | The number of Token Errors/sec reported in a MAC Non-Isolating Error Count frames. A Token Error occurs when the Active Monitor recognizes the need to transmit a token. |
| <station> | LTB | Up to seven station addresses may be selected by the operator. The number of frames/sec sent by each of these stations can be displayed. |
| <protocol> | LTP | Up to four protocols may be selected by the operator. The number of frames/sec sent using each of these protocols can be displayed. |

According to the present invention, the token ring parameters are displayed in a number of windows. Multiple windows may be simultaneously displayed on the computer screen 122. Users may toggle between the windows to see different sets of the token ring parameters. Users may also toggle between the windows to see the token ring parameters displayed in different formats. The selection of the token ring parameters and display formats for each window is implementation dependent.

6. Statistical Dashboard Display for Ethernet Networks

As noted above, the graph routines 106 of the present invention are useful in many applications. For example, the present invention may be used to implement a statistical dashboard display for a protocol analyzer 129 which monitors ethernet networks. Features of the protocol analyzer 129 (other than its information display features) are well known to those with ordinary skill in the art.

The statistical dashboard display of the present invention displays numerous ethernet parameters. These parameters are displayed for each sample period. These parameters are acquired by the protocol analyzer 129 and passed to the graph routines 106 of the present invention. These parameters are listed in Table 2, below. Table 2 also lists the formats in which the parameters may be displayed. In Table 2, L stands for line graph, T stands for table, G stands for gauge, B stands for bar chart, and P stands for pie chart.

Table 2 also provides a brief description of each of the ethernet parameters. These parameters are further described in many publically available documents, such as *Carrier Sense Multiple Access with Collision Detection (CSMA/CD)* (IEEE Standard 802.3-1985, ISO/DIS 8802/3), which is herein incorporated by reference in its entirety.

TABLE 2

| Parameter | Disp. Type | Description |
|---|---|---|
| Utiliz. % | LT | The network traffic as a percentage of the maximum possible network traffic. |
| Utiliz. fr | LT | The network traffic in frames/sec. |
| Utiliz. KB | LT | The network traffic in kilobytes/sec. (kilobytes = 1000 bytes) |
| Errors | LTG | The number of errored frames/sec on the network. |
| Bytes/fr | LTG | The average number of bytes/frame in the traffic on the network. |
| Node Count | LTG | The number of different source node addresses seen in frames on the network. |
| Broadcast fr | LTP | The number of frames/sec sent to the BROADCAST address. |

TABLE 2-continued

| Parameter | Disp. Type | Description |
|---|---|---|
| Multicast fr | LTP | The number of frames/sec sent to MULTICAST addresses. |
| Collisions | LTG | The number of collisions/sec sensed on the network. |
| Runt Frames | LT | The number of illegally short frames (less than 64 bytes long) seen on the network per second. |
| Jabber frames | LT | The number of illegally long frames (more than 1518 bytes long) seen on the network per second. |
| BAD FCS fr | LT | The number of frames with bad Frame Check Sequences seen on the network per second. These are usually frames whose bits have been corrupted by noise, collisions or faulty hardware/software. |
| Misalign fr | LT | The number misaligned frames/sec seen on the network. A misaligned frame is a BAD FCS frame whose length in bits is not evenly divisible by 8 (does not contain an integral number of 8-bit bytes). A misaligned frame is not counted as a BAD FCS frame. |
| <node> | LTB | Up to seven node addresses may be selected by the operator. The number of frames/sec sent by each of these nodes can be displayed. |
| <protocol> | LTP | Up to four protocols may be selected by the operator. The number of frames/sec sent using each of these protocols can be displayed. |

According to the present invention, the ethernet parameters are displayed in a number of windows. Multiple windows may be simultaneously displayed on the computer screen 122. Users may toggle between the windows to see different sets of the ethernet parameters. Users may also toggle between the windows to see the ethernet parameters displayed in different formats. The selection of the ethernet parameters and display formats for each window is implementation dependent.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for efficiently creating and updating a pie-chart displayed on a computer screen, comprising the steps of:
   (1) creating a plurality of forms, each configured to store portions of the pie chart, step (1) including the steps of:
      (a) creating a first form to store a circular outline of the pie chart, said circular outline having a circumference and a center, said first form being one of said first set of forms, and
      (b) creating a second form to store the contents of the pie chart, said second form being one of said second set of forms;
   (2) displaying said first set of forms on the computer screen;
   (3) displaying said second set of forms on the computer screen;
   (4) updating one or more of only said second set of forms; and
   (5) redisplaying only said updated second set of forms on the computer screen.

2. The method of claim 1, wherein step (a) comprises the steps of:
   (i) initializing said first form based upon a specified pie chart size;
   (ii) computing the pixel positions of said circumference and said center of said circular outline;
   (iii) drawing lines between each of said circumference pixel positions, said lines together forming said circular outline; and
   (iv) storing the results of steps (ii) and (iii) in said first form.

3. The method of claim 2, wherein step (b) comprises the steps of:
   (i) initializing said second form based upon said specified pie chart size and said circular outline stored in said first form;
   (ii) scaling one or more data elements specified for display in the pie chart;
   (iii) partitioning said pie chart contents into one or more pie chart segments, each of said pie chart segments associated with one of said data elements, wherein the number of said pie chart segments equals the number of said one or more data elements; and
   (iv) drawing one or more segment boundaries in said second form between said circumference pixel positions and said center pixel position to create said one or more pie chart segments when said number of said one or more data elements is greater than one.

4. The method of claim 3, wherein step (iv) comprises the steps of:
   (aa) initializing a pointer to a first of said circumference pixel positions;
   (bb) drawing a line in said second form between said center pixel position and said first circumference pixel position identified by said pointer;
   (cc) selecting one of said scaled data element values;
   (dd) incrementing said pointer by said selected scaled data element value, said pointer identifying a second of said circumference pixel positions;
   (ee) drawing a line in said second form between said center pixel position said second circumference pixel position identified by said pointer; and
   (ff) repeating steps (iv)(cc)-(ee) for each of said scaled data element values.

5. The method of claim 2, wherein said circumference pixel positions are computed at one percent increments of radial arc of said circular outline.

6. The method of claim 2, wherein said specified pie chart size is received as an input.

7. The method of claim 2, wherein said specified pie chart size is a predetermined constant.

8. The method of claim 3, wherein said data elements comprise token ring network parameters.

9. The method of claim 3, wherein said data elements comprise ethernet network parameters.

10. The method of claim 1, wherein step (b) comprises the steps of:
    (i) initializing said second form based upon a specified pie chart size and said first form;
    (ii) scaling one or more data elements specified for display in the pie chart; and
    (iii) partitioning said pie chart contents into one or more pie chart segments, each of said pie chart segments proportionally representing an associated one of said one or more data elements, wherein the number of said pie chart segments equals the number of said one or more data elements.

11. The method of claim 10, wherein step (b) further comprises the step of:
(iv) drawing one or more segment boundaries in said second form between said circumference pixel positions and said center pixel position to create said one or more pie chart segments when said number of said scaled data elements is greater than one.

12. The method of claim 1, wherein step (ii) comprises the step of:
(aa) converting each of said one or more data elements to an integer representing the proportion said data element is of the sum total of all of said one or more data elements.

13. The method of claim 12, wherein step (iv) comprises the steps of:
(aa) initializing a pointer to a first of said circumference pixel positions;
(bb) drawing a line in said second form between said center pixel position and said first circumference pixel position identified by said pointer;
(cc) selecting one of said scaled data elements;
(dd) incrementing said pointer by said selected scaled data element, said pointer identifying a second of said circumference pixel positions;
(ee) drawing a line in said second form between said center pixel position and said second circumference pixel position identified by said pointer; and
(ff) repeating steps (iv)(cc)–(ee) for each of said scaled data elements.

14. The method of claim 13, wherein step (b) further comprises the steps of:
(v) computing label positions;
(vi) adjusting said label positions;
(vii) drawing one or more labels in said second form at said adjusted label positions, each of said labels corresponding to and identifying one of said pie chart segments; and
(viii) drawing, for each of said one or more labels, a line from said adjusted label position to an optimal pixel position of said circumference pixel positions encompassing said corresponding pie chart segment.

15. The method of claim 14, wherein said step (b)(viii) comprises the steps of:
(aa) halving said selected data element value to form a quotient;
(bb) rounding said quotient to an integer;
(cc) adding said rounded quotient to said incremented pointer to form a sum; and
(dd) saving said sum in an array of label pointers.

16. The method of claim 14, wherein said specified pie chart size is the horizontal width and vertical height in pixels of said pie chart; and
wherein step (a)(ii) performs said computation of said circumference and center pixel positions based upon said specified pie chart size and the associated label size.

17. A method for efficiently creating and updating a pie-chart to display the values of data elements on a computer screen, comprising the steps of:
(1) creating a first form to store a circular outline of the pie chart, said circular outline having a circumference and a center, including the steps of:
(a) computing the pixel positions of said circumference and said center of said circular outline based upon a specified pie chart size,
(b) drawing lines between each of said circumference pixel positions, said lines together forming said circular outline, and
(c) storing the results of steps (a) and (b) in said first form;
(2) creating a second form to store contents of the pie chart;
(3) displaying said first form on the computer screen;
(4) displaying said second form on the computer screen;
(5) updating only said second form; and
(6) redisplaying only said updated second form on the computer screen.

18. The method of claim 17, wherein step (2) comprises the steps of:
(a) initializing said second form based upon said specified pie chart size and said pixel positions stored in said first form;
(b) scaling one or more dam elements specified for display in the pie chart;
(c) partitioning said pie chart contents into one or more pie chart segments, each of said pie chart segments associated with one of said one or more data elements, wherein the number of said pie chart segments equals the number of said one or more data elements;
(d) drawing one or more segment boundaries in said second form between said circumference pixel positions and said center pixel position to create said one or more segments when the number of said one or more data elements is greater than one; and
(e) drawing one or more labels in said second form, each of said labels corresponding to and identifying one of said pie chart segments.

19. A method for displaying information on a computer screen, comprising the steps of:
(1) receiving first data points, second data pints, and third data points;
(2) displaying said first data points in a line graph on the computer screen;
(3) displaying said second data points in a gauge display on the computer screen; and
(4) displaying said third data points in a pie chart on the computer screen, said step (4) comprising steps of
(a) storing a pixel pattern of a circle in a first form wherein said circle pixel pattern represents an outline of the pie chart, wherein step (a) comprising the steps of:
(i) creating said first and second forms,
(ii) computing pixel positions of a circumference of said circle, and
(iii) drawing lines between said pixel positions in said first form.
(b) copying said circle pixel pattern to a second form, and
(c) drawing one or more segment boundaries in said second form within said circle pixel pattern to form segments in said circle pixel pattern according to said third data points, wherein said (c) comprises the steps of:
(i) scaling said third data points;
(ii) initializing a pointer to a first said pixel positions;

(iii) drawing a line in said second form from a center pixel position of said circle to said pixel position identified by said pointer;

(iv) selecting one of said third data points;

(v) incrementing said pointer said selected third data point;

(vi) drawing a line in said second form from said center pixel position to said pixel position identified by said pointer; and (vii) repeating steps (iv)–(vi) for each said third data points.

20. A method for displaying information on a computer screen, comprising the steps of:

(1) receiving first data points, second data pints, and third data points;

(2) displaying said first data points in a line graph on the computer screen;

(3) displaying said second data points in a gauge display on the computer screen, wherein step (3) comprises the steps of:

(a) storing elements of said gauge display in multiple third forms, (b) modifying said gauge display by modifying one or more of said elements in said third forms, (c) overlaying said third forms, and (d) displaying said overlayed third forms on the computer screen; and (4) displaying said third data points in a pie chart on the computer screen, wherein step (4) comprises steps of:

(a) storing a pixel pattern of a circle in a first form wherein said circle pixel pattern represents an outline of the pie chart, (b) copying said circle pixel pattern to a second form, and (c) drawing one or more segment boundaries in said second form within said circle pixel pattern to form segments in said circle pixel pattern according to said third data points.

21. A method for displaying information on a computer screen, comprising the steps of:

(1) receiving first data points, second data pints, and third data points;

(2) displaying said first data points in a line graph on the computer screen, wherein step (2) comprises the steps of:

(a) drawing said line graph on multiple third forms, (b) displaying said third forms on the computer screen, (c) modifying one of said third forms to modify said line graph, and (d) displaying only said modified third form on the computer screen;

(3) displaying said second data points in a gauge display on the computer screen; and (4) displaying said third data points in a pie chart on the computer screen, wherein step (4) comprises steps of:

(a) storing a pixel pattern of a circle in a first form wherein said circle pixel pattern represents an outline of the pie chart, (b) copying said circle pixel pattern to a second form, and (c) drawing one or more segment boundaries in said second form within said circle pixel pattern to form segments in said circle pixel pattern according to said third data points.

* * * * *